United States Patent
Lu et al.

(10) Patent No.: US 9,418,047 B2
(45) Date of Patent: Aug. 16, 2016

(54) METHOD AND APPARATUS OF A FULLY-PIPELINED FFT

(71) Applicant: Tensorcom, Inc., Carlsbad, CA (US)

(72) Inventors: Bo Lu, Carlsbad, CA (US); Ricky Lap Kei Cheung, San Diego, CA (US); Bo Xia, Carlsbad, CA (US)

(73) Assignee: Tensorcom, Inc., Carlsbad, CA (US)

( * ) Notice: Subject to any disclaimer, the term of this patent is extended or adjusted under 35 U.S.C. 154(b) by 234 days.

(21) Appl. No.: 14/192,725

(22) Filed: Feb. 27, 2014

(65) Prior Publication Data

US 2015/0242365 A1 Aug. 27, 2015

(51) Int. Cl.
*G06F 17/14* (2006.01)

(52) U.S. Cl.
CPC .................. *G06F 17/142* (2013.01)

(58) Field of Classification Search
None
See application file for complete search history.

(56) References Cited

U.S. PATENT DOCUMENTS

| | | | | |
|---|---|---|---|---|
| 5,034,910 A * | 7/1991 | Whelchel | ............... | G06F 17/142 708/407 |
| 6,081,821 A * | 6/2000 | Hopkinson | ............ | G06F 17/142 708/404 |
| 6,917,955 B1 * | 7/2005 | Botchev | ................ | G06F 17/142 708/404 |
| 7,397,871 B2 | 7/2008 | Wiss et al. | | |
| 2005/0143125 A1 | 6/2005 | Maltsev et al. | | |
| 2006/0128348 A1 | 6/2006 | Jang | | |
| 2012/0278373 A1 * | 11/2012 | Kobayashi | ............ | G06F 17/142 708/404 |
| 2012/0314750 A1 | 12/2012 | Mehrabani | | |
| 2014/0016677 A1 | 1/2014 | Dua et al. | | |
| 2015/0242365 A1 * | 8/2015 | Lu | ......................... | G06F 17/142 708/404 |

OTHER PUBLICATIONS

"A 7Gb/s SC-FDE/OFDM MMSE equalizer for 60GHz wireless communications", Hsiao, F.; Tang, A.; Yang, D.; Pham, M.; Chang, M.-C.F., Solid State Circuits Conference (A-SSCC), 2011 IEEE Asian, Digital Object Identifier: 10.1109/ASSCC.2011.6123570, Publication Year: 2011, pp. 293-296.
"Design of efficient radix-8 butterfly PEs for VLSI", Widhe, T.; Melander, J.; Wanhammar, L. Circuits and Systems, 1997. ISCAS '97., Proceedings of 1997 IEEE International Symposium on vol. 3 Digital Object Identifier: 10.1109/ISCAS.1997.621567 Publication Year: 1997, pp. 2084-2087 vol. 3.

\* cited by examiner

*Primary Examiner* — David H Malzahn
(74) *Attorney, Agent, or Firm* — Steven J Shattil

(57) ABSTRACT

A plurality of three bit units (called triplets) are permuted by a shuffler to shuffle the positions of the triplets into different patterns which are used to specific the read/write operation of a memory. For example, the least significant triplet in a conventional counter can be placed in the most significant position of a permuted three triplet pattern. The count of this permuted counter triplet generates addresses that jump 64 positions each clock cycle. These permutations can then be used to generate read and write control information to read from/write to memory banks conducive for efficient Radix-8 Butterfly operation. In addition, one or more triplets can also determine if a barrel shifter or right circular shift is required to shift data from one data lane to a second data lane. The triplets allow efficient FFT operation in a pipelined structure.

20 Claims, 25 Drawing Sheets

| Operation | Radix-2 | Radix-4 | Radix-8 |
|---|---|---|---|
| Complex Multiplications | 2048 | 1536 | 896 |
| Real Multiplications | 0 | 0 | 768 |
| Complex Additions | 4608 | 4608 | 4608 |
| Real Additions | 0 | 0 | 768 |
| Memory Access | 4608 | 2560 | 1536 |

METHOD AND APPARATUS OF A FULLY-PIPELINED FFT

CROSS-REFERENCE TO OTHER APPLICATIONS

Not applicable.

BACKGROUND OF THE INVENTION

Federal Communications Commission (FCC) has allotted a spectrum of bandwidth in the 60 GHz frequency range (57 to 64 GHz). The Wireless Gigabit Alliance (WiGig) is targeting the standardization of this frequency band that will support data transmission rates up to 7 Gbps. Integrated circuits, formed in semiconductor die, offer high frequency operation in this millimeter wavelength range of frequencies. Some of these integrated circuits utilize Complementary Metal Oxide Semiconductor (CMOS), Silicon-Germanium (SiGe) or GaAs (Gallium Arsenide) technology to form the dice in these designs. The receive path of the signal being transferred in the wireless channel in these communication system need to be compensated for various very dispersive conditions occurring in the wireless channel. Some of these conditions include multipath reflection, multipath resilience, ISI (Inter Symbol Interference), channel capacity, strategies for frequency diversity scheduling, etc.

CMOS (Complementary Metal Oxide Semiconductor) is the primary technology used to construct integrated circuits. N-channel devices and P-channel devices (MOS device) are used in this technology which uses fine line technology to consistently reduce the channel length of the MOS devices. Current channel lengths are 40 nm, the power supply of VDD equals 1.2V and the number of layers of metal levels can be 8 or more.

CMOS offers the computing power to perform many of the required compensation techniques requires overcoming the adverse conditions of the wireless channel. Yet, the computing power must be used in a power efficient manner to insure that the dissipated power is low enough to allow these important building blocks of the transceiver fabricated in CMOS to be used in mobile applications. This helps to insure that the energy drawn from the limited power contained in the battery is minimized while achieving the optimum performance.

Orthogonal frequency division multiplexing (OFMA) is a multi-carrier system that has been used in various communication Standards such as 802.11 (Wi-Fi), digital video broadcasting (DVB), asymmetrical digital subscriber lines (ASDL), etc. However, OFDM suffers from several deficiencies including peak to average power ratio (PAPR), sensitivity to amplifier nonlinearities, and effects of frequency offsets. Single carrier (SC) communication systems, however, overcome these several deficiencies and offer several benefits over OFDM systems.

SC communication systems is a single-carrier transmit signal that partitions their wideband channel into a large number of parallel narrowband subcarriers and has a lower PAPR resulting in design parameters in the transmit path that are simpler to achieve when compared to OFDM.

In the transmitter side as illustrated in FIG. 1, the input signals are mapped 1-2 into symbols, then the symbols are converted from a serial path into parallel blocks with a series to parallel (S/P) converter 1-3 so a cyclic prefix 1-4 can be added to each block. A parallel to serial (P/S) converter 1-5 recombines these blocks into a serial link which is zero padded and filtered 1-6. A digital to analog (D/A) converter 1-7 converts the digital serial link to an analog signal and presented to an analog transmitter 1-8. The signal is sent over the wireless channel 1-9 which time disperses the signal and introduces noise 1-21 into the signal. A receiver front end 1-10 receives the distorted wireless signal and converts the signal to a digital signal with an analog to digital (A/D) converter 1-11. The signals are then filtered 1-12. The prefix is removed 1-13 and a S/P converter 1-14 generates a time domain of parallel block signals that are converter by an fast Fourier transform (FFT) 1-15 in to the frequency domain. A frequency domain equalizer 1-16 is applied to each of the transmitted subcarriers where the channel distortion caused by the channel is compensated for each subcarrier by the frequency domain equalizer. The FFT and frequency domain equalization requires less computation power than an equivalent performing time-domain equalization. An inverse FFT (IFFT) 1-17 generates the time domain representation of the frequency compensated transmitted signal to a de-mapper unit 1-18 after which the signal is applied to a P/S converter 1-19. The output signal is applied to the baseband circuitry of the receiver to extract the signals from the transmitter. The composite of the FFT, FDE and IFFT contained within the dotted box 1-20 and will be described in more detail shortly.

In single carrier systems, the operation to create blocks causes latency to increase while bandwidth efficiency is decreased because of the addition of the cyclic prefix which transforms the linear channel convolution into a circular one. However, a block level structure of the signals is required so that the FDE can perform the compensation for each block. The cyclic prefix efficiently eliminates time spreading between the blocks. The time spreading is caused by multipath propagation of the signal in the wireless channel.

The Discrete Fourier Transform within the FFT (See: T. Widhe, J. Melander, and L. Wanhammar, "*Design of Efficient Radix-8 Butterfly PEs for VLSI*", Circuits and Systems, 1997. ISCAS '97. Proceedings of 1997 IEEE International Symposium, 9 Jun. 1997-12 Jun. 1997, pages 2084-2087 vol. 3) is defined as:

$$X(n) = \sum_{k=0}^{N-1} x(k) \cdot W^{nk}, W = e^{-j\frac{2\pi}{N}} \tag{EQ. 1}$$

The input is $x=[x(0), x(1), \ldots, x(N-1)]^T$ while the output is $X=[X(0), X(1), \ldots, X(N-1)]^T$. The matrix form $X=F_8 x$ of the radix-8 Sande-Tukey algorithm can be expressed as:

$$F_s = \begin{bmatrix} 1 & 1 & 1 & 1 & 1 & 1 & 1 & 1 \\ 1 & W_s & -j & -jW_s & -1 & -W_s & j & jW_s \\ 1 & -j & -1 & j & 1 & -j & -1 & j \\ 1 & -jW & j & W_s & -1 & jW_s & -j & -W_s \\ 1 & -1 & 1 & -1 & 1 & -1 & 1 & -1 \\ 1 & -W_s & -j & jW_s & -1 & W_s & j & -jW_s \\ 1 & j & -1 & -j & 1 & j & -1 & -j \\ 1 & jW_s & j & -W_s & -1 & -jW_s & -j & W_s \end{bmatrix} \tag{EQ. 2}$$

and after the matrix is factored:

$$F_s = \begin{bmatrix} 1 & 0 & 0 & 0 & 1 & 0 & 0 & 0 \\ 0 & 0 & 0 & 1 & 0 & 0 & 0 & -j \\ 0 & 1 & 0 & 0 & 0 & j & 0 & 0 \\ 0 & 0 & 1 & 0 & 0 & 0 & 1 & 0 \\ 1 & 0 & 0 & 0 & -1 & 0 & 0 & 0 \\ 0 & 0 & 0 & 1 & 0 & 0 & 0 & j \\ 0 & 1 & 0 & 0 & 0 & -j & 0 & 0 \\ 0 & 0 & 1 & 0 & 0 & 0 & -1 & 0 \end{bmatrix}$$  (EQ. 3)

$$\begin{bmatrix} 1 & 0 & 0 & 0 & 1 & 0 & 0 & 0 \\ 1 & 0 & 0 & 0 & -1 & 0 & 0 & 0 \\ 0 & 1 & 0 & 0 & 0 & j & 0 & 0 \\ 0 & 1 & 0 & 0 & 0 & -j & 0 & 0 \\ 0 & 0 & 1 & 0 & 0 & 0 & 1 & 0 \\ 0 & 0 & -1 & 0 & 0 & 0 & 1 & 0 \\ 0 & 0 & 0 & -jW_s & 0 & 0 & 0 & W_s \\ 0 & 0 & 0 & jW_s & 0 & 0 & 0 & -W_s \end{bmatrix}$$

$$\begin{bmatrix} 1 & 0 & 0 & 0 & 1 & 0 & 0 & 0 \\ 1 & 0 & 0 & 0 & -1 & 0 & 0 & 0 \\ 0 & 1 & 0 & 0 & 0 & 1 & 0 & 0 \\ 0 & 1 & 0 & 0 & 0 & -1 & 0 & 0 \\ 0 & 0 & 1 & 0 & 0 & 0 & 1 & 0 \\ 0 & 0 & 1 & 0 & 0 & 0 & -1 & 0 \\ 0 & 0 & 0 & 1 & 0 & 0 & 0 & 1 \\ 0 & 0 & 0 & 1 & 0 & 0 & 0 & -1 \end{bmatrix}$$

where the signal flow graph of the radix-8 butterfly is illustrated in FIG. 2A. This butterfly uses 24 complex additions 2-1, 2 multiplications by $$F_8 = \begin{bmatrix} 1 & 0 & 0 & 0 & 1 & 0 & 0 & 0 \\ 0 & 0 & 0 & 1 & 0 & 0 & 0 & -j \\ 0 & 1 & 0 & 0 & 0 & j & 0 & 0 \\ 0 & 0 & 1 & 0 & 0 & 0 & 1 & 0 \\ 1 & 0 & 0 & 0 & -1 & 0 & 0 & 0 \\ 0 & 0 & 0 & 1 & 0 & 0 & 0 & j \\ 0 & 1 & 0 & 0 & 0 & -j & 0 & 0 \\ 0 & 0 & 1 & 0 & 0 & 0 & -1 & 0 \end{bmatrix}$$  (EQ. 3)

$$\begin{bmatrix} 1 & 0 & 0 & 0 & 1 & 0 & 0 & 0 \\ 1 & 0 & 0 & 0 & -1 & 0 & 0 & 0 \\ 0 & 1 & 0 & 0 & 0 & j & 0 & 0 \\ 0 & 1 & 0 & 0 & 0 & -j & 0 & 0 \\ 0 & 0 & 1 & 0 & 0 & 0 & 1 & 0 \\ 0 & 0 & -1 & 0 & 0 & 0 & 1 & 0 \\ 0 & 0 & 0 & -jW_8 & 0 & 0 & 0 & W_8 \\ 0 & 0 & 0 & jW_8 & 0 & 0 & 0 & -W_8 \end{bmatrix}$$

$$\begin{bmatrix} 1 & 0 & 0 & 0 & 1 & 0 & 0 & 0 \\ 1 & 0 & 0 & 0 & -1 & 0 & 0 & 0 \\ 0 & 1 & 0 & 0 & 0 & 1 & 0 & 0 \\ 0 & 1 & 0 & 0 & 0 & -1 & 0 & 0 \\ 0 & 0 & 1 & 0 & 0 & 0 & 1 & 0 \\ 0 & 0 & 1 & 0 & 0 & 0 & -1 & 0 \\ 0 & 0 & 0 & 1 & 0 & 0 & 0 & 1 \\ 0 & 0 & 0 & 1 & 0 & 0 & 0 & -1 \end{bmatrix}$$

2-2, and 4 trivial multiplications by j 2-3. The three stages of the butterfly are shown as 2-1, 2-4 and 2-5.

For a 512 FFT operation, FIG. 2B presents a table 2-6 where the total complex multiplications, real multiplications, complex additions, real additions and the number of memory accesses for an FFT using Radix-2 2-7, Radix-4 2-8 and Radix-8 2-9. The multiplications are the most complicated operations. Note that for the Radix-8 case, the number of complex multiplications is only 896, while the real multiplications increase to 768. Note that four multiplications are required for the complex multiplications. Thus, the overall multiplications of the Radix-8 are about 1150 which is about 25% less overall multiplications than the Radix-4 case. In addition, the memory access is about 40% less that the Radix-4 case.

FIG. 3A presented the block diagram of an architecture for a pipelined FFT processor using a radix-r butterfly. The input signal is applied to an unscrambler 3-1 to generate r inputs to the first Radix-r Butterfly processing unit (PE) 3-2. A first commutator 3-3 re-routes the output signals of the first Radix-r Butterfly PE 3-2 to the second Radix-r Butterfly PE 3-4. Similarly, the second commutator 3-5 re-routes the output signals of the second Radix-r Butterfly PE 3-4 to the third Radix-r Butterfly PE 3-6 to generate the final output signals.

In FIG. 3B, another representation of the architecture for a radix-8 is illustrated. The input signal is applied to a first S1 buffer 3-8 to generate 8 inputs to the first S1 Radix-8 Butterfly processing unit (PE) 3-9. The S1 twiddle factors 3-7 are also applied to the first PE 3-9. The twiddle factor refers to a complex multiplication of a constant to allow recursively combining smaller FFTs. An S2 buffer 3-10 captures and applies the output signals of the first S1 Radix-8 Butterfly PE 3-9 to the second S2 Radix-8 Butterfly PE 3-11. The S2 twiddle factors 3-12 are also applied to the second PE 3-11. Similarly, third S3 buffer 3-13 captures and applies the output signals of the second S2 Radix-8 Butterfly PE 3-11 to the final Radix-8 Butterfly PE 3-14 with a twiddle factor of 1 to generate the final output signals.

The dotted box 1-20 in FIG. 1 is expanded in FIG. 4 to provide a block diagram of the frequency domain equalizer (FDE). This block diagram is used to determine the transfer equations for the FTT 4-1, equalizer 4-4 and IFFT 4-5. The FDE supports binary phase shift keying (BPSK) and quadrature phase shift keying (QPSK). The system operates on a block of 8 complex samples every cycle for 64 cycles performing at a rate of 440 MHz/512 points. The FFT 4-1 and IFFT 4-5 can be radix-8 butterflies (the IFFT uses conjugate inputs) while the equalizer 4-4 is a multiplier. A time domain signal y(t) is applied to the input of the FFT-512. In addition, the time domain signal h(t) of the channel estimation is also applied to the FFT-512. The FFT-512 generates a frequency signal H(f) which is applied to the H(f) buffer 4-3. The output of the H(f) buffer 4-3 generates:

$$\hat{H}(f) = \frac{H(f)}{|H(f)|^2 + \sigma^2} \qquad \text{(EQ. 4)}$$

which is applied to the equalizer 4-4 where σ is the noise in the channel. The frequency transformed signal Y(f) at the output of the FFT-512 is also applied to the equalizer. The signal at the output of the equalizer is $\hat{X}(f)$ and is given by:

$$\hat{X}(f) = \frac{H(f)^* Y(f)}{|H(f)|^2 + \sigma^2} = \hat{H}(f)^* Y(f) \qquad \text{(EQ. 5)}$$

The signal $\hat{X}(f)$ is applied to the IFFT-512 4-5 to generate the estimated output signal $\hat{x}(t)$.

The time domain channel estimate $\hat{h}(n)$ is used to calculate $$\hat{H}(k) = \frac{1}{N} \sum_{n=0}^{N-1} \hat{h}(n) e^{-j\frac{2\pi kn}{N}} \qquad \text{(EQ. 6)}$$

and Parseval' theorem $$\sum_{n=0}^{N-1} |\hat{h}(n)|^2 = \frac{1}{N} \sum_{k=0}^{N-1} |\hat{H}(k)|^2 \qquad \text{(EQ. 7)}$$

is used to calculate the estimated signal to noise ratio (SNR).

$$\text{Estimated } SNR = \frac{\sum_{n=0}^{N-1} |\hat{h}(n)|^2}{\sigma^2} \qquad \text{(EQ. 8)}$$

The SNR is used to determine the Error Vector Magnitude (EVM) for the Minimum Mean Square Error (MMSE) Frequency Domain Estimator (FDE):

$$\text{Estimated } EVM = \frac{\sigma^2}{N} \sum_{k=0}^{N-1} \frac{1}{|\hat{H}(k)|^2 + \sigma^2} \qquad \text{(EQ. 9)}$$

If after the header is decoded, the estimated EMV is not sufficient to decode the packet, then the packet is ignored to save power.

The SC FDE can perfectly equalize for multipath using a 64-tap delay line. The operation of the FDE requires Interference and Noise power estimation. The FFT and IFFT operation occurs for each transmission block. The modulation scheme can be binary phase switch keying (BFSK) or quandary phase switch keying (QPSK). The SNR for the FFT and IFFT is about 30 db.

More detail of the FFT-Equalizer-IFFT path is depicted in FIG. 5. A control unit 5-6 provides the control signals for the datapath flow. The input signals of the datapath 5-2 are applied to the Storage block 5-4. The output of the Storage block 5-4 is provided to the MUX 5-5. The channel estimation uses the Golay Matched Filter 5-1 to generate the channel estimation 5-3 of the wireless channel and is also provide to the MUX 5-5. A digital signal (not illustrated) selects one of the two inputs to the MUX. Eight streams are applied to the FDE where a symbol consisting of a plurality of bits is sampled each clock tick. These signals are sent to the FFT-512 4-1 which transforms the time domain signals to the frequency domain signals. The FFT-512 4-1 generates a frequency signal H(f) which is applied to the H(t) buffer 4-3. The output of the H(f) buffer 4-3 is applied to the equalizer 4-4. The IFFT-512 4-5 transforms the frequency domain signals of the datapath back to the time domain where the signals are compensated by the CPE Comp 5-7. The time domain signals at the output of the IFFT-512 are also used to estimate the common phase error (CPE) 5-8 which is then applied to the CPE Comp. The final signals are applied to the QAM demapper 5-9 and applied to the baseband signal processing elements (not illustrated).

BRIEF SUMMARY OF THE INVENTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions. Consequently, it may be appreciated that the terminology used herein should be considered to be representative and exemplary, and not exclusive of other terminology which is similar or related in meaning. It will be understood that this inventive technique may include any combination of hardware and/or software suitable for performing one or more tasks described elsewhere herein, e.g., one or more central processing units (CPUs) or microprocessors and optional memory configured to execute one or more tasks of operating a pipelined FFT as they will be described further herein.

An inventive embodiment of one of the inventions is partitioning of the 9-bit address into three triplets. These triplets are permuted by using a shuffler which shuffles the positions of the three triplets to generate different permutations. These permutations can then be used to generate read and write control information for memory banks. In addition, if at least one selected triplet from the permutation changes state, a barrel shifter or right circular shift can be configured to respond to this change and shift symbols between data lanes, i.e., shift symbols from one data lane to a second data lane. This process can occur between all data lanes causing the symbols to rotate one or more positions. This information is used to access and write memory so that the symbols or indices are applied a butterfly in an FFT manner that allows pipelined operation to occur in a minimum amount of time. The barrel shifter can shift symbols from the current data lane to either the data lane to the right or the data lane to the left (both directions). The right circular shift can shift symbols from the current data lane to the data lane to the right (one direction).

Another inventive embodiment of one of the inventions is partitioning of the 9-bit address into three triplets and permuting the triplets into several different patterns. One of the triplets is used to identify one of the memories in the 8 memory bank. The other two triplets are selected from a conventional 6-bit counter. When these triplets are combined into three triplets, the bits within the triplets acquire the digital weight of their new position in the permuted triplet. The address is then generated by using any two of the three triplets selected from the permuted triplet. These two triplets then are used to address the memory bank for either read or write operations. The least significant triplet in a conventional counter can be placed in the most significant position of a permuted three triplet pattern. The count of this permuted counter triplet generates addresses that jump 64 positions each clock cycle, while the triplet identifying the memory in the bank can be used together to read/write symbols or indices to/from a butterfly of an FFT efficiently in a pipelined structure.

Another embodiment of one of the present inventions is an apparatus for a pipelined fast Fourier transform (FFT) comprising: a first counter adapted to generate a first triplet and a second triplet; a plurality of memories each configured to be identified by a third triplet; a shuffler adapted to permute said first, second, and third triplets into a first sequence; a plurality of first data lanes providing symbols; a first barrel shifter configured to shift symbols between said plurality of first data lanes if at least one selected triplet of said first sequence changes state; said plurality of memories adapted to store one symbol from each of the first data lanes based on a first address formed by any two of said three triplets in said first sequence; a second counter adapted to generate a fourth triplet and a fifth triplet; said shuffler adapted to permute said fourth, fifth, and third triplets into a second sequence; each of said plurality of memories adapted to transfer stored symbols based on a second address formed by any two of said three triplets in said second sequence to a plurality of second data lanes; a second barrel shifter configured to shift stored symbols between second data lanes if at least one selected triplet of said second sequence changes state; and a first processing element (PE) of said pipelined FFT configured to receive stored symbols from said second data lanes, wherein said first PE calculates Radix-8 Butterfly symbols based on said stored symbols received from said second data lanes, further comprising: a parallel to serial converter configured to translate transmission block (TB) symbols to said plurality of first data lanes, wherein said TB symbols represent received noisy channel symbols, wherein said store is a write to said plurality of memories and said transfer is a read from said plurality of memories, wherein said first barrel shifter shifts said symbols between first data lanes either right or left; and said second barrel shifter shifts said stored symbols between second data lanes either right or left, wherein all symbols are complex comprising I and Q values wherein each value consists of a plurality of bits.

Another embodiment of one of the present inventions is an apparatus for a pipelined fast Fourier transform (FFT) comprising: a first counter adapted to generate a first n-tuple and a second n-tuple; a plurality of memories each configured to be identified by a third n-tuple; a shuffler adapted to permute said first, second, and third n-tuples into a first sequence; a plurality of first data lanes providing samples; said plurality of memories adapted to store one symbol from each of the first data lanes based on a first address formed by any two of said three n-tuples in said first sequence; a second counter adapted to generate a fourth n-tuple and a fifth n-tuple; said shuffler adapted to permute said fourth, fifth, and third n-tuples into a second sequence; each of said plurality of memories adapted to transfer stored symbols based on a second address formed by any two of said three n-tuples in said second sequence to a plurality of second data lanes; and a first processing element (PE) of said pipelined FFT configured to receive stored symbols from said second data lanes, wherein said first PE of said pipeline FFT calculates result symbols based on said stored symbols received from said second data lanes, wherein said first processing element is a Radix-N Butterfly where N is equal to 2 raised to an integer power greater than 0, further comprising: a first barrel shifter configured to shift symbols between first data lanes if at least one selected n-tuple of said first sequence changes state; and a second barrel shifter configured to shift stored symbols between second data lanes if at least one selected n-tuple of said second sequence changes state, wherein said first barrel shifter shifts said symbols between first data lanes either right or left; and said second barrel shifter shifts said stored symbols between second data lanes either right or left, wherein said store is a write to said plurality of memories and said transfer is a read from said plurality of memories, wherein all symbols are complex comprising I and Q values and each value consists of a plurality of bits.

Another embodiment of one of the present inventions is an apparatus for a pipelined fast Fourier transform (FFT) comprising: a plurality of memories each with stored symbols; a first counter adapted to generate a first n-tuple and a second n-tuple; said shuffler adapted to permute said first, second, and third n-tuples into a first sequence; each of said plurality of memories adapted to transfer one stored symbol based on a first address formed by any two of said three n-tuples in said first sequence to a plurality of first data lanes; a first processing element (PE) of said pipelined FFT configured to receive stored symbols from said first data lanes; and said first PE of said pipeline FFT calculates symbols based on said stored symbols received from said first data lanes, further comprising: a second counter adapted to generate a fourth n-tuple and a fifth n-tuple; said plurality of memories each configured to be identified by a third n-tuple; a shuffler adapted to permute said fourth, fifth, and third n-tuples into a second sequence; a plurality of second data lanes providing symbols; a second barrel shifter configured to shift symbols between second data lanes if at least one selected n-tuple of said second sequence changes state; and said plurality of memories adapted to store one symbol from each of the second data lanes based on a second address formed by any two of said three n-tuples in said second sequence, wherein said store is a write to said plurality of memories and said transfer is a read from said plurality of memories. The apparatus further comprising: a first barrel shifter configured to shift symbols between first data lanes if at least one selected n-tuple of said first sequence changes state, wherein said first barrel shifter shifts said stored symbols between two different data lanes; and said second barrel shifter shifts said symbols between two different data lanes, wherein all symbols are complex comprising I and Q values and each value consists of a plurality of bits, wherein said first processing element is a Radix-N Butterfly where N is equal to 2 raised to an integer power greater than 0.

According to another general aspect, a computer program product may be tangibly embodied on a computer-readable medium and may include executable code that, when executed, is configured to cause a data processing apparatus to determine the FFT results using an embodiment of the inventive technique.

BRIEF DESCRIPTION OF THE DRAWINGS

Please note that the drawings shown in this specification may not necessarily be drawn to scale and the relative dimensions of various elements in the diagrams are depicted schematically. The inventions presented here may be embodied in many different forms and should not be construed as limited to the embodiments set forth herein. Rather, these embodiments are provided so that this disclosure will be through and complete, and will fully convey the scope of the invention to those skilled in the art. In other instances, well-known structures and functions have not been shown or described in detail to avoid unnecessarily obscuring the description of the embodiment of the invention. Like numbers refer to like elements in the diagrams.

FIG. 2B presents a comparison of operations for the Radix-2, Radix-4 and Radix-8 butterflies.

FIG. 7A depicts a write and read memory table for the Stage-1 Radix-8 butterfly in accordance with an embodiment of one of the present inventions.

FIG. 13A presents a write and read memory table for the Stage-3 Radix-8 butterfly in accordance with an embodiment of one of the present inventions.

DETAILED DESCRIPTION OF THE INVENTION

Figure 1:
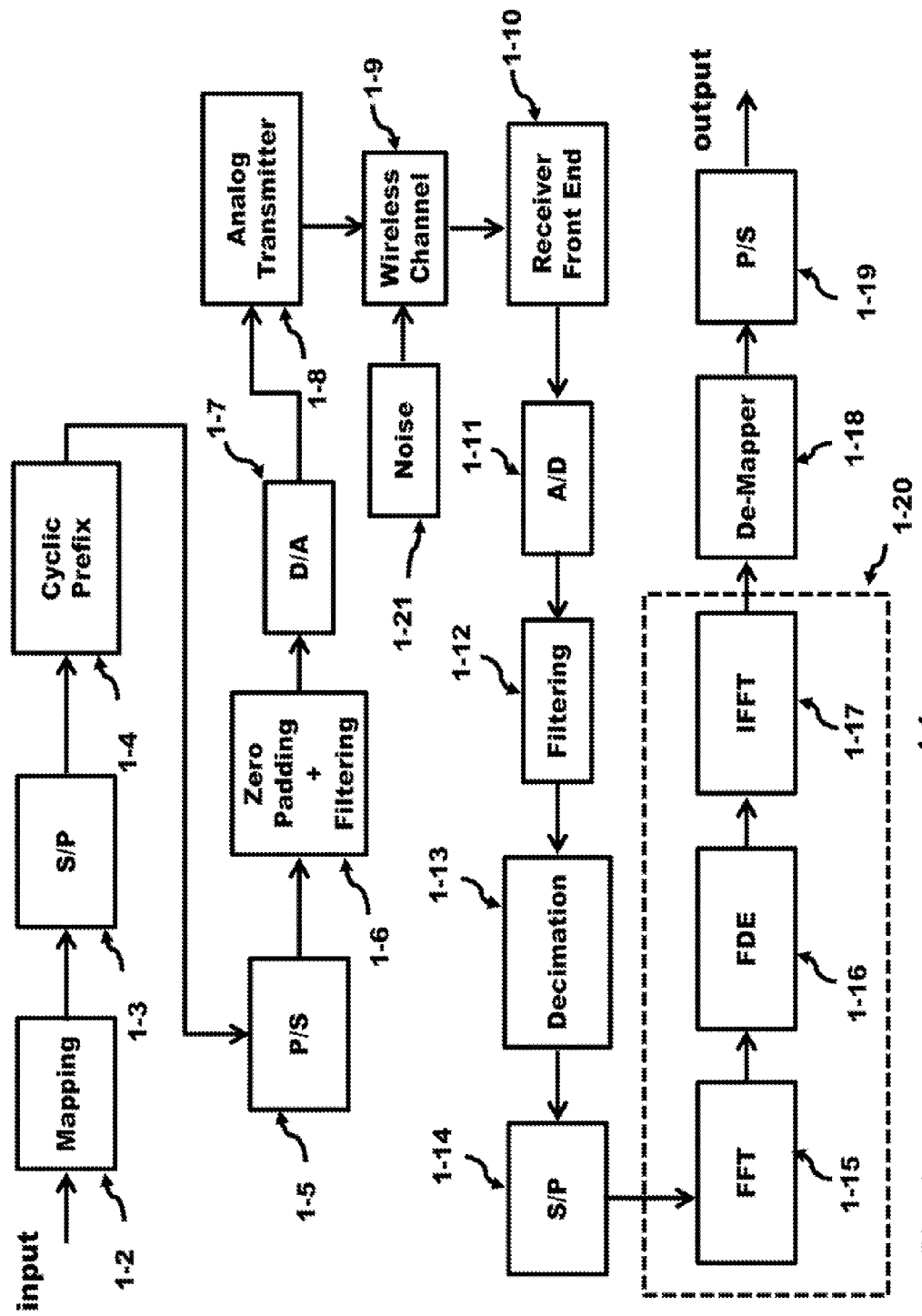
FIG. 1 depicts the transmitter and receiver blocks diagrams for a SC system.
Figure 2A:
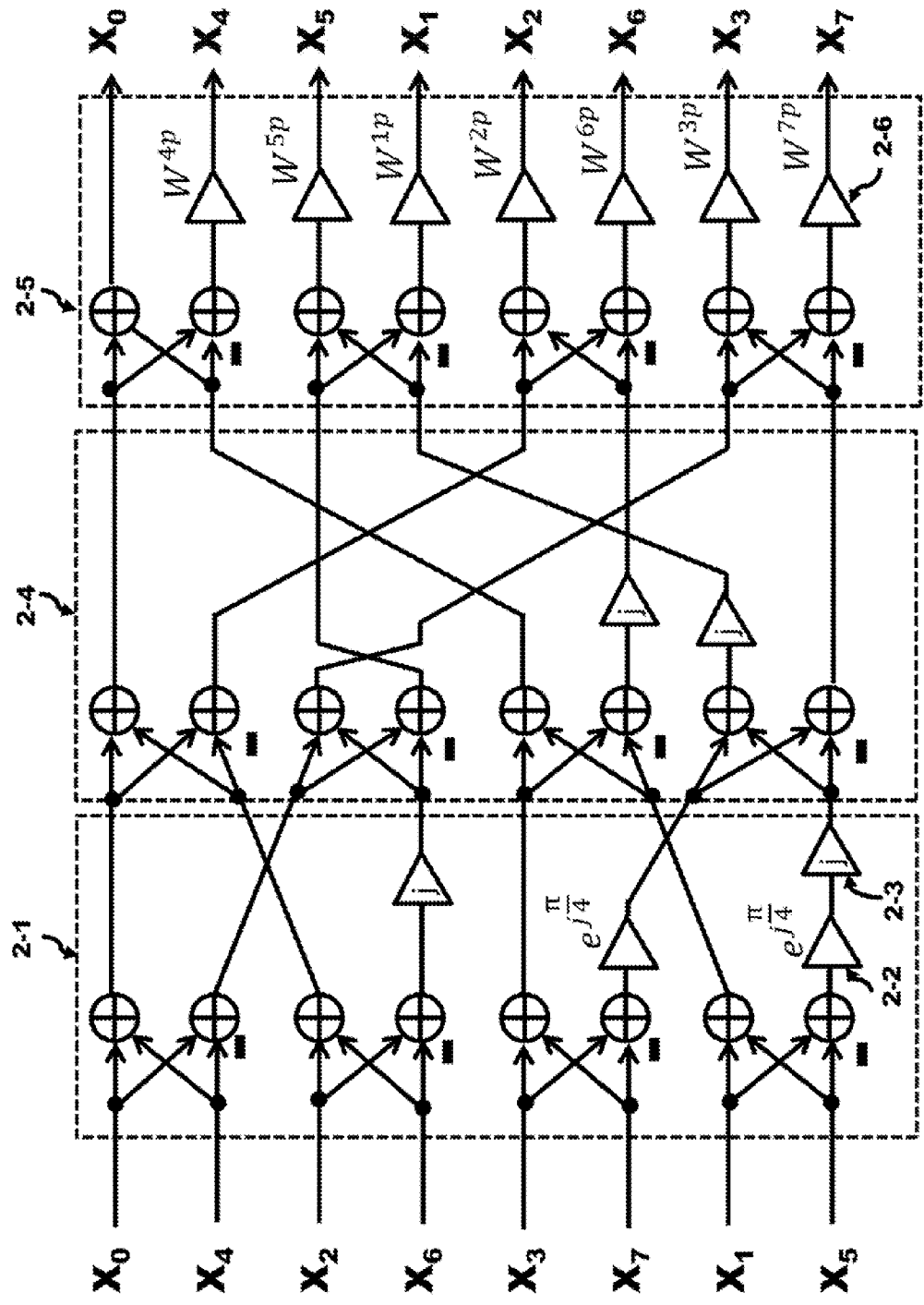
FIG. 2A shows an signal flow graph of a radix-8 butterfly FFT.
Figure 3A:
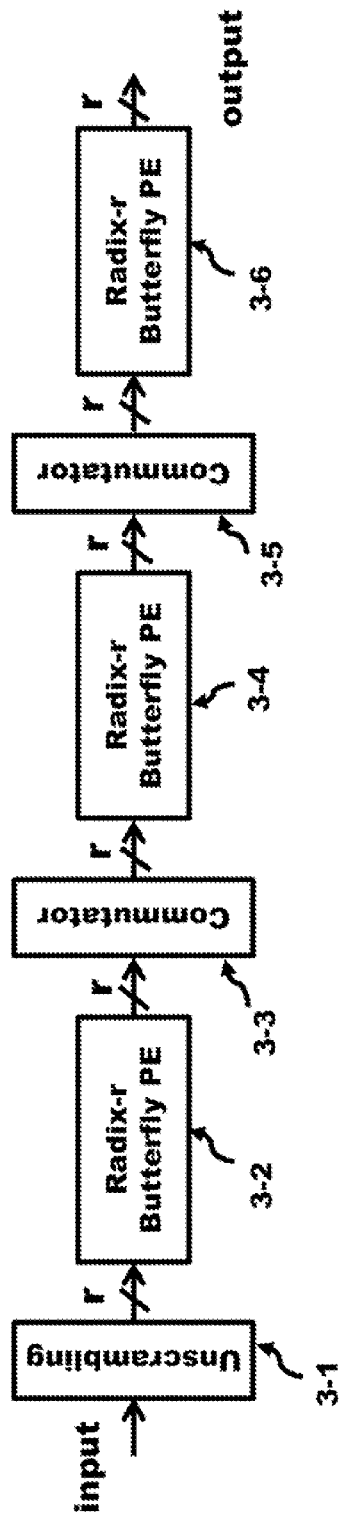
FIG. 3A depicts a block diagram of the signal flow in a Radix-r butterfly.
Figure 3B:
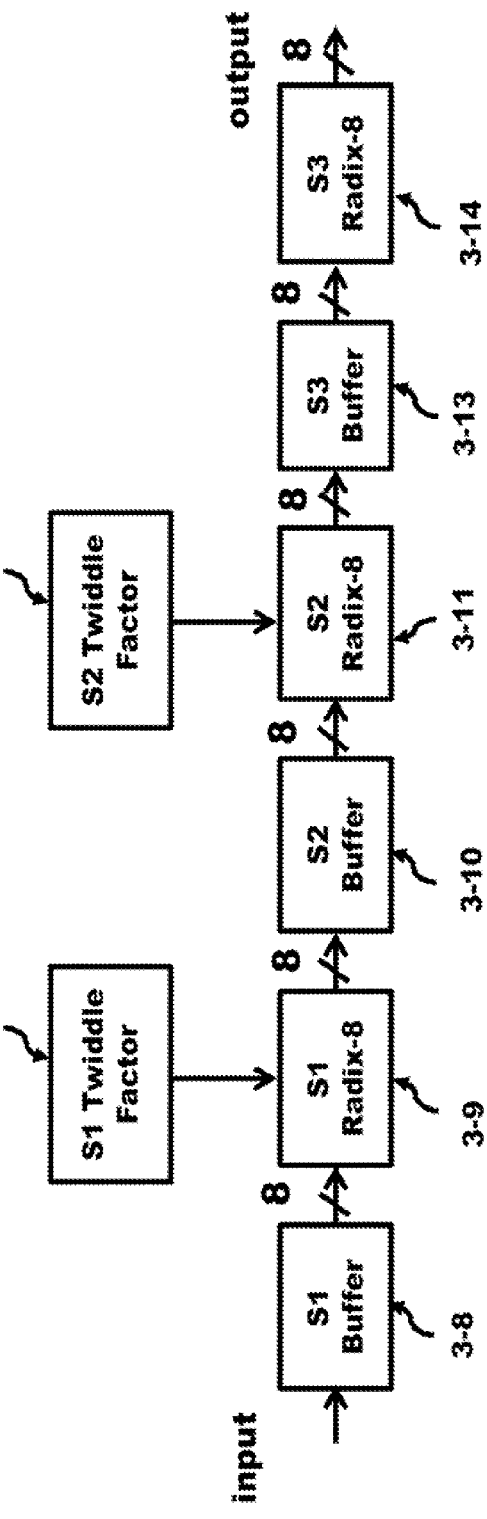
FIG. 3B shows a block diagram of the signal flow in a Radix-8 butterfly including twiddle factors.
Figure 4:
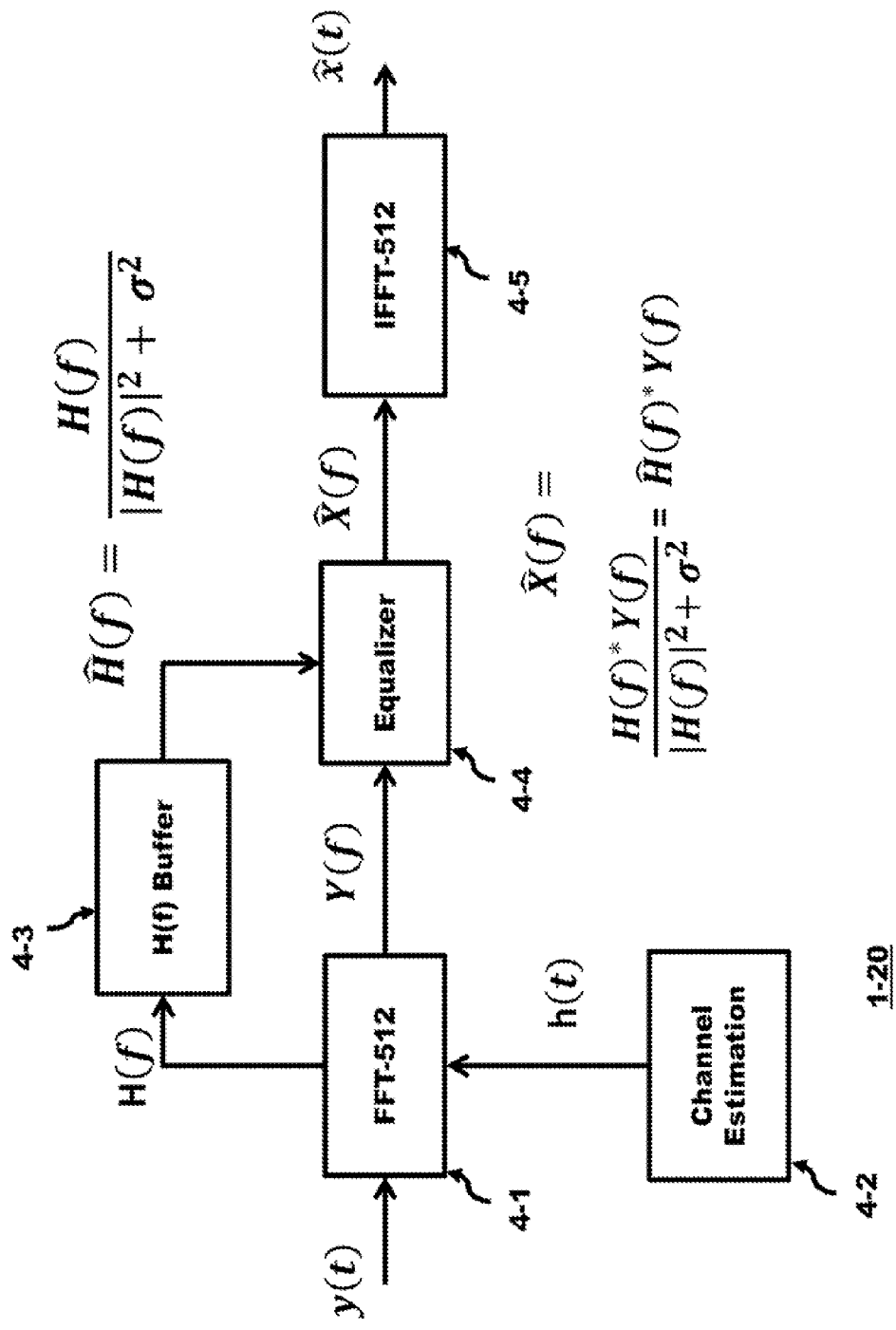
FIG. 4 depicts a block diagram of the Frequency Equalizer embedded in a 512 FFT.
Figure 5:
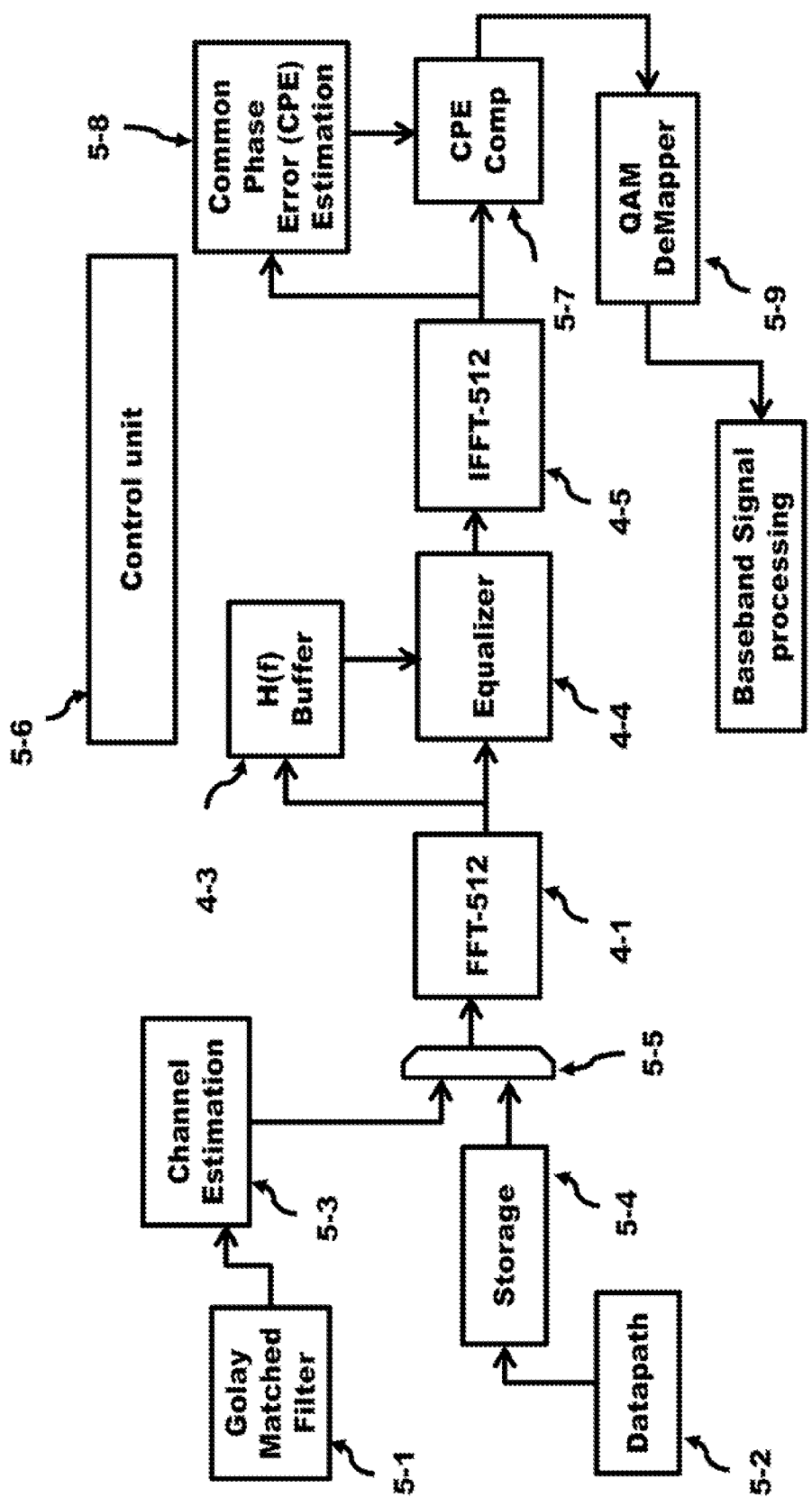
FIG. 5 illustrates another block diagram of the Frequency Equalizer embedded in a 512 FFT including associated blocks.
Figure 6A:
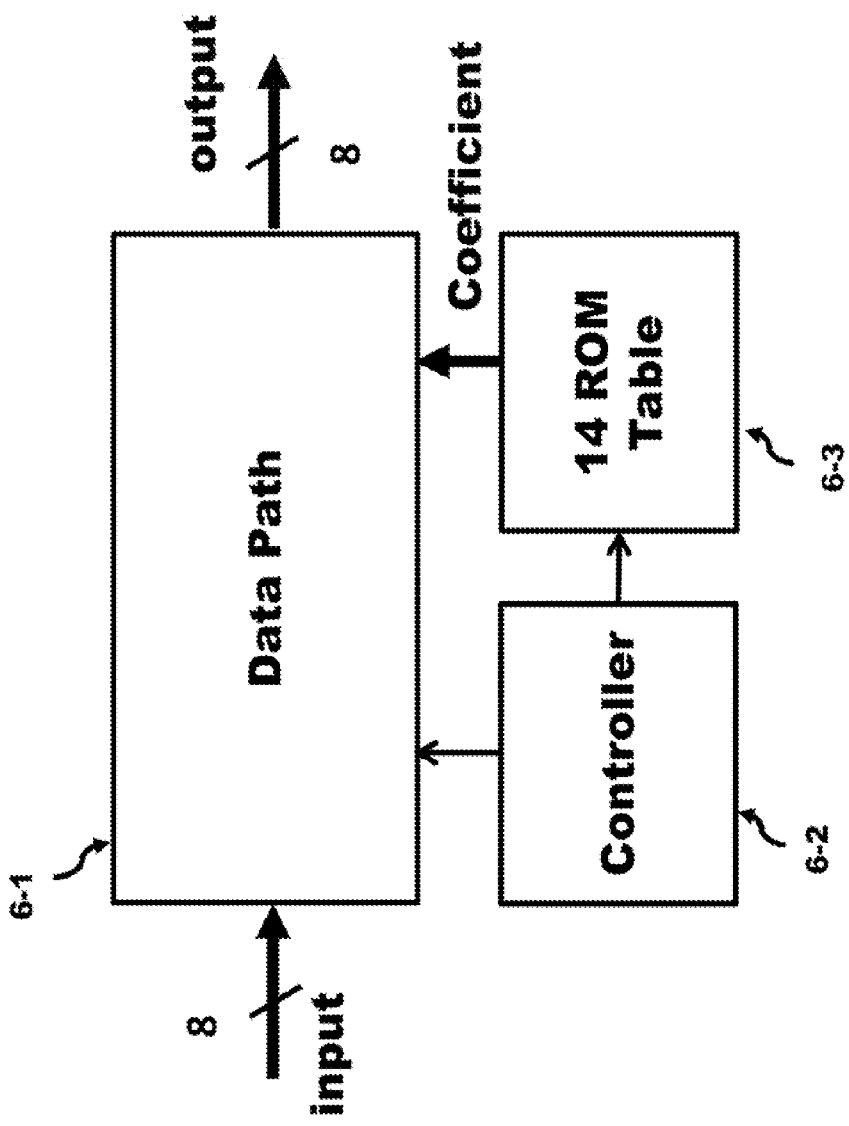
FIG. 6A presents a block diagram of the data path, controller and ROM for a Processor Element (PE).

FIG. 6A illustrates a block diagram of a single processing element (PE) data path 6-1 with eight input and eight output streams. The streams flow continuously through three stages of the FFT in a pipeline fashion. Each stage is called a processing element (PE) stage and simultaneously processes eight symbols per clock at a frequency of 440 MHz. One transmission block (TB) of 512 symbols is finished every 64 cycles. A six bit counter generates the cycle count, controls the data path, addresses the memory and used for the twiddle factor ROM.

The FFT operates on 512 symbols received serially from the noisy channel. One Transmission Block (TB) contains 512 symbols which are operated on by the FFT and IFFT. The 512 symbols are complex each comprising an I and a Q signal. A serial to parallel interface provides 8 symbols in any given cycle for a period of 2.27 ns (1/440 MHz). The block of 512 symbols is thus partitioned into a sequence of 64 sets of 8 symbols which need to be processed by each PE within the FFT. These 64 sets of 8 symbols are stored into memory and extracted in a particular pattern appropriate for the butterfly matrix. One of the embodiments of the invention is an innovative way of coupling a counter to the memory to read the correct pattern of symbols from the memory and apply this pattern directly to the PE or butterfly. In this read operation, the content at the memory location is transferred over a data lane coupled to the PE. Another embodiment of the invention is an innovative way of coupling another counter to another memory to write or store the computed pattern of symbols from the PE directly to this different memory. Another innovative technique is to partition the address into triplets and shuffle the triplets in permuted orders to perform read/write memory operations and use the triplets to determine if a right circular shift is required. These innovative techniques are applied to each PE/memory in the FFT chain until the FFT result is complete and in the proper sequence, that is, in the original order presented to the FFT.

This processing element requires a total of 20 complex multiplications. 14 ROMs are used where seven of the ROMs have 64 entries and the other seven ROMs have eight entries. A controller 6-2 controls the ROM table 6-3 and the data path 6-1. The ROM table outputs of two sets of 7 bit words indicative of the twiddle factor. The first set is for the first processing element and the second set is for the second processing element. The third processing element receives a twiddle factor of one. The data path 6-1 comprises a single stage of a butterfly/shuffle.

The equalizer after the FFT equalizes a multipath signal and uses a Minimum Mean Squared Estimate (MMSE) filtering technique to determine the Interference and Noise power estimation. The FDE consumes 125 mW of average power and uses a gate count of 400K gates. The signal to quantization noise ratio (SQNR) for the FFT and OFFT is close to 30 dB. The TB is a data unit as specified in the IEEE 802.11ad phy standard. Each TB contains exactly 512 complex numbers, as stated earlier, and is used for one FFT or IFFT operation. Each packet data payload is partitioned into multiple TBs. The processing of the preamble takes time, so to compensate for the additional compute time, the Stage-1 memory bank stores 4TBs of data to process the preamble. Once the data preamble processing has completed, the FFT/IFFT operations can start.

Figure 6B:
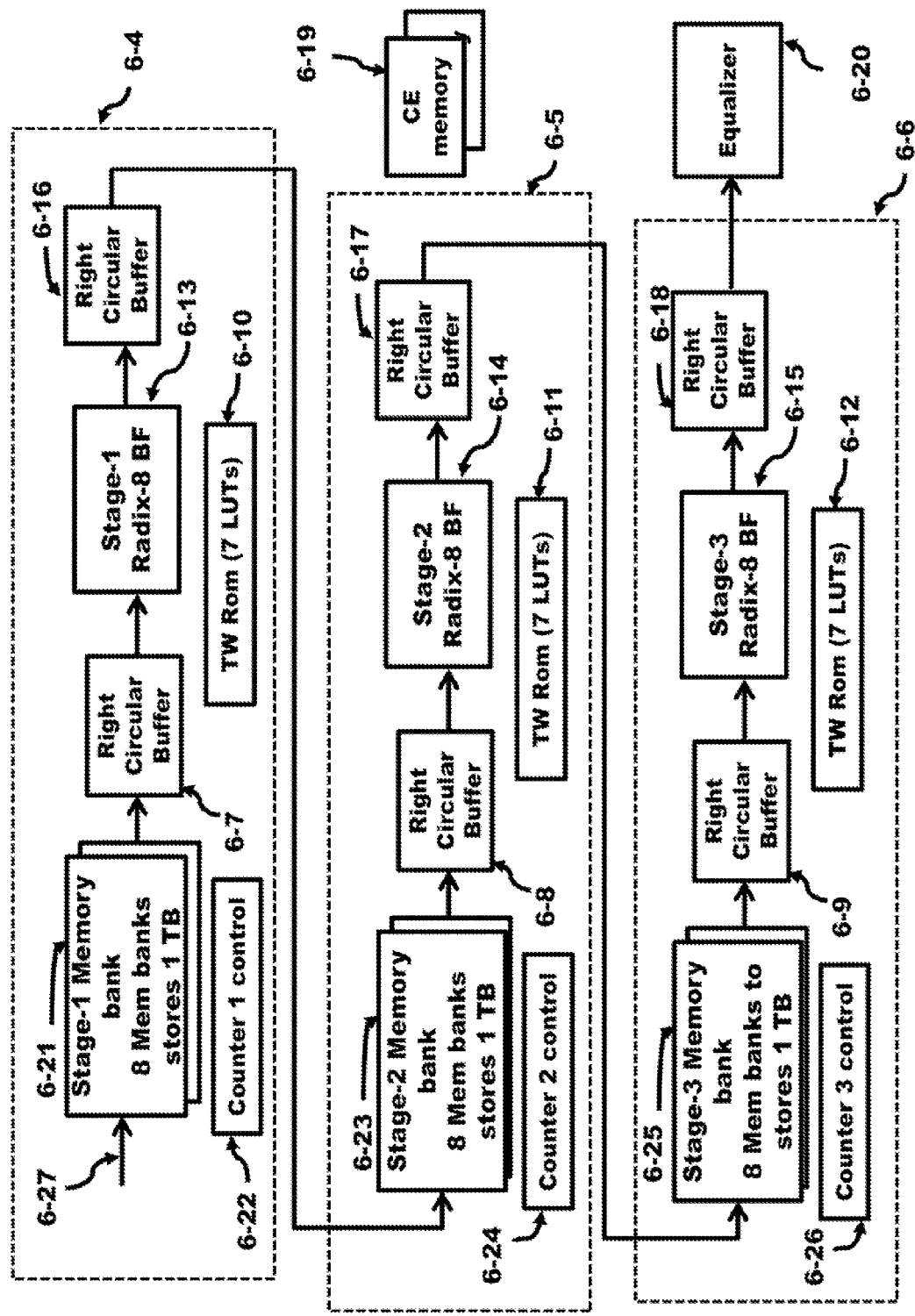
FIG. 6B presents a block diagram of three stages of the Radix-8 butterfly including the PE, circular buffers, control, ROMs, CE memory and equalizer in accordance with an embodiment of one of the present inventions.

FIG. 6B illustrates how the processing elements are coupled together. The first processing element 6-4 consists of the Stage-1 memory bank 6-21, the right circular shift (RCS) 6-7, the Stage-1 radix 8 BF 6-13, the RCS 6-16, a counter 1 controller 6-22, and the ROM 6-10 that introduces the twiddle factors. The second processing element 6-5 consists of the Stage-2 memory bank 6-23, the right circular shift (RCS) 6-8, the Stage-2 radix 8 BF Stage 6-14, the RCS 6-17, a counter 2 controller 6-24, and the ROM 6-11 that introduces the twiddle factors. Finally, the last processing element 6-6 consists of the Stage-3 memory bank 6-25, the right circular shift (RCS) 6-9, the Stage-3 radix 8 BF Stage 6-15, the RCS 6-18, a counter 3 controller 6-26, and the ROM 6-12 that introduces the twiddle factors. The output of the last PE 6-6 is applied to the equalizer 6-20. An additional CE memory bank 6-19 is also shown. Each memory bank stores a Transmission Block (TB) where a TB contains 512 symbols allowing pipeline operation to be performed. The RCS can rotate the data output of the memory right one position, every cycle if required, in a circular loop. The counter control block is used to control the timing, generate memory write or store information, determine if a RCS is required, and provide memory read information. The TW Rom provides the twiddle factors for the radix-8 BF stages.

Figure 6C:
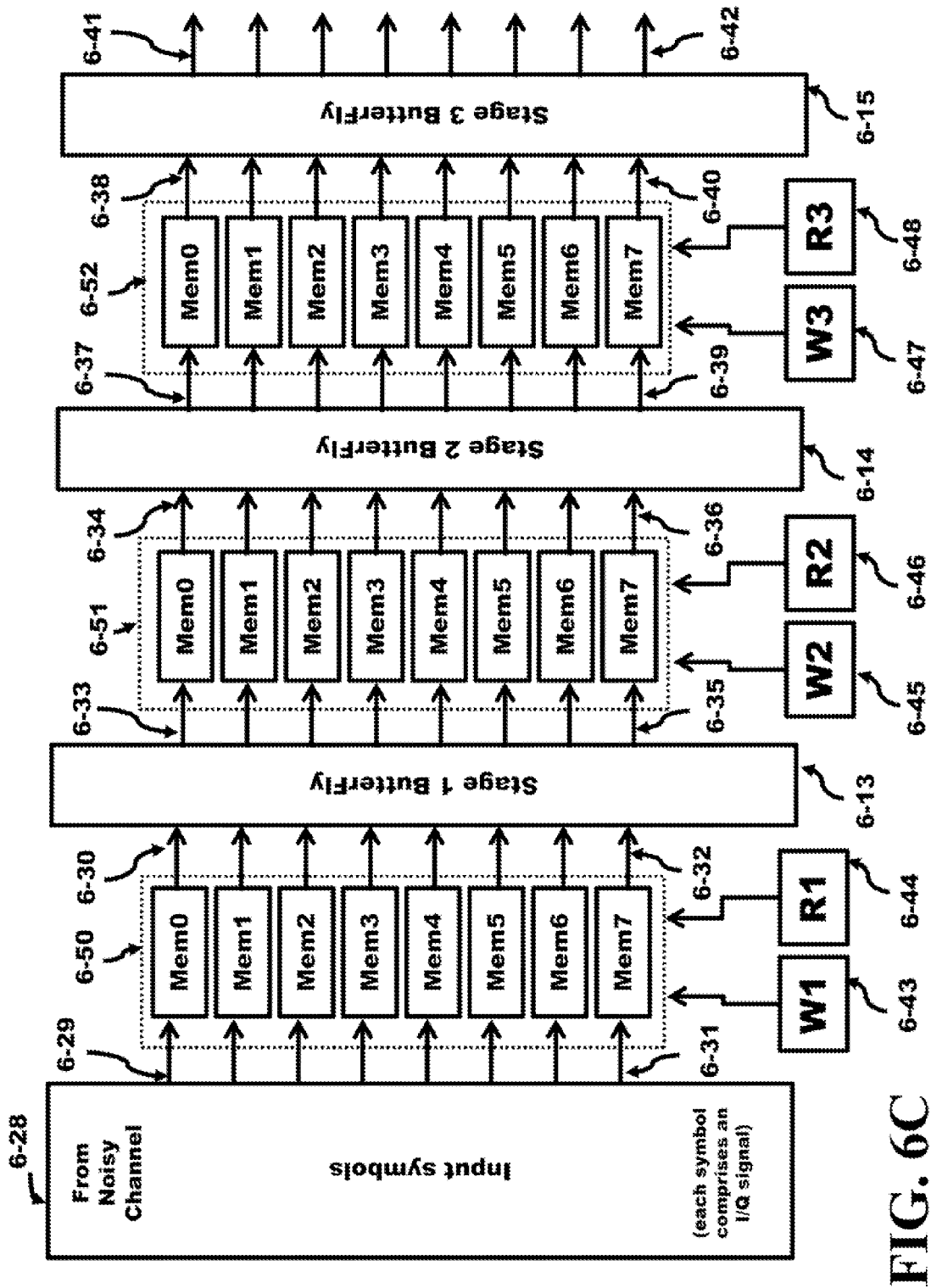
FIG. 6C presents a block diagram of several units coupled together.

Another perspective of the FFT system is presented in FIG. 6C. The input symbols 6-28 from the noisy channel are written to the Stage-1 memory bank 6-50 on the plurality of data lanes bounded by 6-29 and 6-31. The Stage-1 memory 6-50 has a write W1 6-43 and a read R1 6-44 controller. These controllers control the timing, generate memory write information, determine if a RCS is required, and provide memory read information. When the Stage-1 memory bank 6-50 is read, the 8 wide out ranging from interconnect 6-30 to 6-32 is applied in the correct sequence, determined by the R1 6-44 controller, to the inputs of the Stage 1 butterfly 6-13.

The output of the Stage 1 butterfly 6-13 is written to the Stage-2 memory bank 6-51, presented in the correct order by the W2 6-45 controller, on the 8 data lanes bounded by 6-33 and 6-35. The Stage-2 memory 6-51 also has a read R2 6-46 controller. These controllers include the counters and any additional control logic. When the Stage-2 memory bank 6-51 is read, the 8 data lanes on interconnects 6-34 to 6-36 is applied are the correct sequence, determined by the R2 6-46 controller, to the inputs of the Stage 2 butterfly 6-14.

The output of the Stage 2 butterfly 6-14 is written to the Stage-3 memory bank 6-52, presented in the correct order by the W3 6-47 controller, on the 8 data lanes bounded by 6-37 and 6-39. The Stage-3 memory 6-52 also has a read R3 6-48 controller. These controllers include the counters and any additional control logic. When the Stage-3 memory bank 6-52 is read, the 8 data lanes on interconnects 6-38 to 6-40 is applied in the correct sequence, determined by the R3 6-48 controller, to the inputs of the Stage 3 butterfly 6-15. The outputs of the Stage 3 butterfly 6-15 bounded by 6-41 and 6-42 are applied to the equalizer (shown in FIG. 6B).

Bit patterns generated from the counters and memory addressing specifications are used to specific the data pattern and addressing of the memory. An n-tuple which is an ordered set of a elements (bits) is used in this innovative invention. The bit patterns are partitioned into a plurality of three bit units each called a triplet. For example, when the bit pattern is arranged in increasing digital weight, the bit pattern b8, b7, b6, b5, b4, b3, b2, b1, b0 would be partitioned into three triplets [b8, b7, b6], [b5, b4, b3], and [b2, b1, b0] where each triplet comprises three bits. The first one [b8, b7,b6] is called the third triplet (TT), the second one [b5, b4,b3] is called the second triplet (ST), and the last one [b2, b1,b0] is called the first triplet (FT). These three triplets can be permutated from the conventional digitally weighted original permutation TT, ST, and FT into several other (6!) possibilities) three-triplet permutations. For example, two other permutations are: TT, FT, and ST and ST, TT, and FT.

The permutations are used to generate the Address's Bit permutation. Different bit permutation patterns: pattern-1, pattern-2, and pattern-3 are declared as indicated in Table 1 below. Additional permutations can be created.

TABLE 1

Several different triplet permutation patterns.

| permutation | pattern | Triplet sequence |
| --- | --- | --- |
| pattern-0 (original) | {[b8, b7, b6], [b5, b4, b3], [b2, b1, b0]} | TT, ST, FT |
| pattern-1 | {[b8, b7, b6], [b2, b1, b0], [b5, b4, b3]} | TT, FT, ST |
| pattern-2 | {[b5, b4, b3], [b8, b7, b6], [b2, b1, b0]} | ST, TT, FT |
| pattern-3 | {[b5, b4, b3], [b2, b1, b0], [b8, b7, b6]} | ST, FT, TT |

The TT triplet [b8, b7,b6] is always used to identify the particular memory within the given memory bank, independent of the position of this triplet within the permutation. Table 2 provides the triplet value and the corresponding memory that it accesses:

TABLE 2

Memory position.

| [b8, b7, b6] | Memory position in Memory bank |
| --- | --- |
| 000 | Mem0 |
| 001 | Mem1 |
| 010 | Mem2 |
| 011 | Mem3 |
| 100 | Mem4 |
| 101 | Mem5 |
| 110 | Mem6 |
| 111 | Mem7 |

Note that the triplet for TT spans over space and not time. That is, once this TT is assigned a value, that value defines the location and identification of that one particular memory out the eight memories in a memory bank remains constant. However, the triplets FT and ST vary over time (one of the two changes each cycle in the total 64 cycle sequence).

These innovative embodiments of the different created permutations are calculated based on triplets as mentioned earlier. The triplets can be used to determine if a right circular shift (RCS) should be performed on the addresses or data (written into)/(read out) of the various memory banks such that the generated data patterns applied to the Stage-1, Stage-2 or Stage-3 Radix-8 butterfly structures conform to the specified pattern required for that particular given butterfly structure. The counters generate 6 bits comprising two triplets; while, the permutations are 9 bits comprising three triplets.

There are three sets of 6-bit counters as illustrated in FIG. 6C: counter read 1 6-44, counter write 1 6-43; counter read 2 6-46, counter write 2 6-45; and counter read 3 6-48, counter write 3 6-47. These three sets of counters each generate 6 bits which are digitally weighted from the LSB to the MSB and make two triplets: [bit position 5, bit position 4, bit position 3, bit position 2, bit position 1, bit position 0].

The conventional count output corresponds to the sequential count of the cycle number of each one of the required 64 cycles that the PE needs to perform the calculation. Each of the above counter outputs can be described as: {[a second counter triplet], [a first counter triplet]} where the second counter triplet (SCT) is [bit position 5, bit position 4, bit position 3] while the first counter triplet (FCT) is [bit position 2, bit position 1, bit position 0]. The counter triplets, FCT and SCT, can substitute for either the FT or ST triplet in the permutations provided in Table 1 above, as illustrated in the following Table 3:

TABLE 3

Several different triplet permutation patterns.

| permutation | pattern | Triplet sequence |
| --- | --- | --- |
| pattern-0 sequence | {[b8, b7, b6], [SCT], [FCT]} | TT, SCT, FCT |
| pattern-1 sequence | {[b8, b7, b6], [FCT], [SCT]} | TT, FCT, SCT |
| pattern-2 sequence | {[SCT], [b8, b7, b6], [FCT]} | SCT, TT, FCT |
| pattern-3 sequence | {[SCT], [FCT], [b8, b7, b6]} | SCT, FCT, TT, |

After the counter's triplets after permutation are used to create the different pattern-N sequences given in Table 3, the new position of each of the bits within the permuted triplets within the pattern-N sequence carries the corresponding weight of the conventional of that given position. For example, in the pattern-1 sequence, the original bit position 5 in [SCT] which corresponded to a weight of 32 due to the permutation now corresponds to a weight of 4; the original bit position 1 in FCT which corresponded to a weight of 2 due to the permutation now corresponds to 16. In other words, once one of the given permutations in Table 3 is selected, the bit position in the new permutation carries the digital weight for the position of that bit in the current permutation. However, the control and sequencing of these bits may be dependent on the output of a counter; the sequencing of this bit position within the triplet is determined by the given bit position within that originating triplet.

For example, the pattern-3 sequence has 9-bits or 3 triples. As a whole, it represents 512 subcarriers. i.e. the pattern-3 sequence represents subcarrier indices. The triple labeled [b8, b7,b6]=TT is always used to determine the memory bank selection (See Table 2) and is FIXED for all 64 cycles. (i.e. it is a CONSTANT, and actually not part of the permuted counter). The remaining 2 triples (or 6-bits) [b5, b4,b3][b2, b1,b0] (SCT and FCT) are actual counter bits, at least one of the bits change values every clock cycle. These 2 triples are counter outputs and serve as common addresses to all 8 memories. They represent memory addresses and they are COMMON for all 8 memories each identified by one of the eight TT given in Table 2. That is how 8 memories each with 64 entries hold 512 distinctive symbol indices. Thus, the 3 triples as a whole represent the subcarrier indices, or the labels you put on each of the butterflies' input symbols.

The write/read control for the Stage-1 memory bank is based on the count of the (counter read 1) and (counter write 1) counters. The write/read control for the Stage-2 memory bank is based on the count of the (counter read 2) and (counter write 2) counters. The write/read control for the Stage-3 memory bank is based on the count of the (counter read 3) and (counter write 3) counters. The (counter read 2) and (counter write 2) counters start 64 cycles later than the (counter read 1) and (counter write 1) counters. The (counter read 3) and (counter write 3) counters start 8 cycles later than the (counter read 2) and (counter write 2) counters. There are 2 transformations: address bit permutation, and data bit permutations (RCS) are determined by the changing conditions of one or more triplets in a selected permutation.

As mentioned above, separate counters are used for the memory read and memory write operations. For memory write, the write counter generates memory write addresses and the start time needs to align with first data outputs from preceding radix-8 butterfly processing element. For memory read, the read counter generates memory read addresses and the start time for the memory read needs to make sure the required data is available in the memory before being accessed. Thus, once the reading operation starts, there is no "stall" cycle, since the data to be read has already being written into the memory. The read operation occurs for 64 cycles, so all of the required data needs to reside within the memory when a read fetch is performed (no write-after-read hazard is allowed!). The Stage-1 memory bank read starts after the Stage-1 memory bank has stored all the data symbols. The Stage-2 memory bank read starts after the Stage-2 memory bank is in the 57th write cycle. The Stage-3 memory bank read starts after the Stage-3 memory bank read is in the 8th write cycle. This constitutes 3 stages of pipeline operation for the 512-pt IFFT/FFT.

For each Transmission Block (TB), the memories are 64 deep because an 8 memory bank 64 deep can hold 512 symbols. To specify each of the 64 deep positions, a counter output with two triplets (total of 6 bits) is required. To specify the location of the 512 symbols, the remaining triplet is used to provide the location since $2^9=512$, since each TB comprises 512 symbols.

The count sequence is determined by selecting two of the three triplets within one of the pattern-N sequences. Once selected, this count sequence is applied to the memory. In addition, the right circular shift (RSC), also known as a barrel shifter, is determined by the occurrence of a change within one or more triplets. A change is defined as follows: assume the triplet has a first value in cycle n, then in cycle n+1 the triplet has a second value. If the first value is equal to the second value, then there is no change; therefore, the RCS is not performed. On the other hand, if the first value is different from the second value, then there is a change; therefore, the RCS is performed.

The sequence TT, SCT, and FCT which is called the pattern-0 sequence is used to write the symbols from the channel into the Stage-1 memory bank. For this case, the combination of the SCT and FCT triplets (two triplets form a combination) is selected to represent the counter value and is defined as the zeroth combination. The SCT and FCT triplets are used to calculate the value of the addressing scheme. The zeroth combination contains the sequence output of a conventional counter since the triplets SCT and FCT are since in their original positions (have not been permutated) and therefore would generate values which sequentially increase by 1. The values of the zeroth combination are 0, 1, 2, 3 . . . 7, 8, 9 . . . or [000 000], [000 001], [000 010], [000 011] . . . [000 111], [001 000], [001 001] . . . . Note these addresses will span the full range of 0-63. Thus, the address would be identical for Mem0, Mem1 . . . Mem7. After the serial to parallel conversion of the serial input symbols stream to a parallel 8 byte wide data lane, Mem0 is written with the 0th symbol 6-53, Mem7 with the 7th symbol 6-54 in the first cycle (cycle 0) 6-55

Figure 6D:
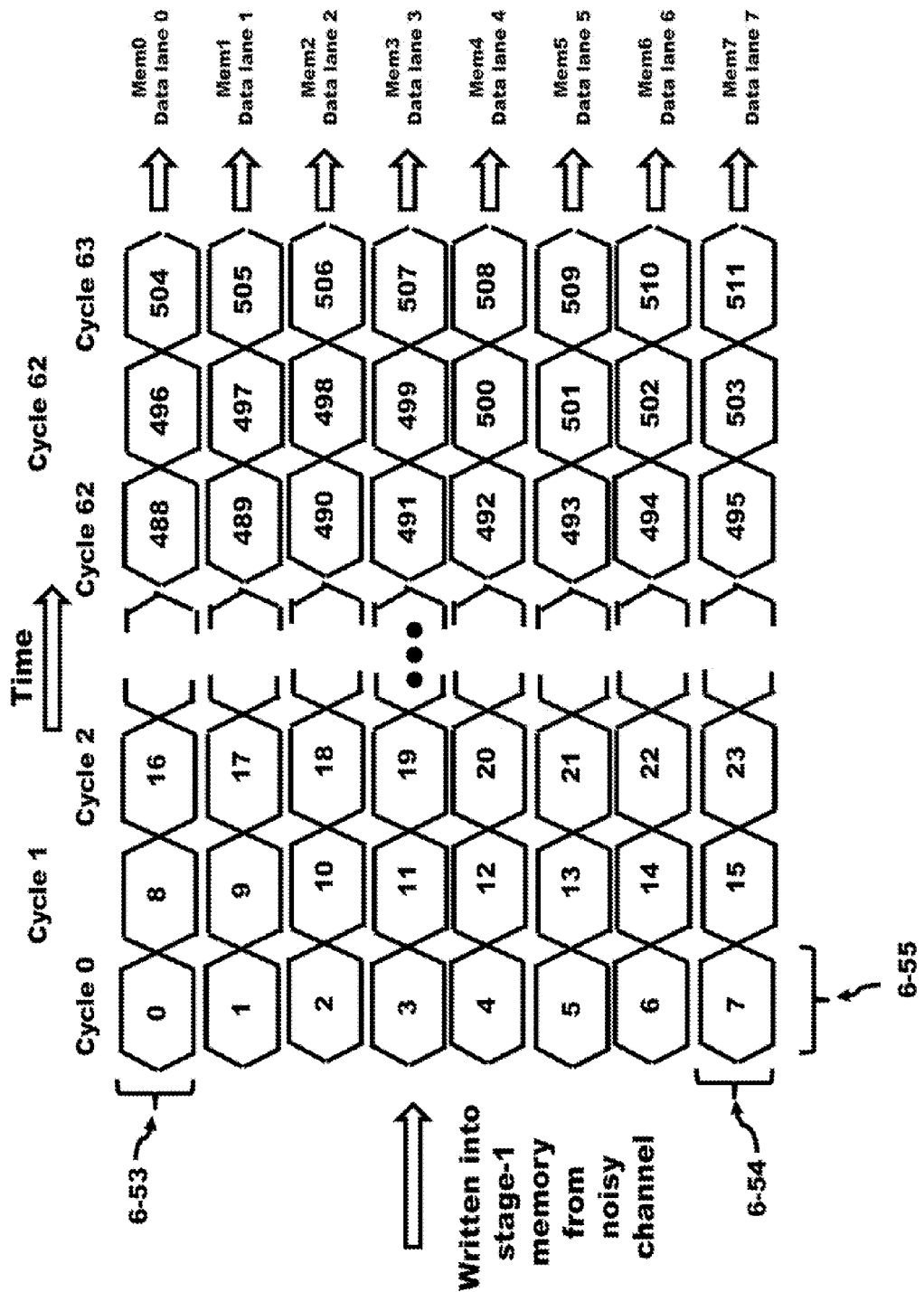
FIG. 6D illustrates a timing diagram of data from a noisy channel written into a Stage-1 memory bank in accordance with an embodiment of one of the present inventions.

(See FIG. 6D). If this pattern continued, the 64th, 128th . . . 448th symbols would be written into Mem0 during cycle 8, 16 . . . 56, respectively. When these symbols are required, they would be read from Mem0 and placed on data lane 0. However, the $64^{th}$ symbol is required to be read from Mem1 and provided to the data lane 1 for the Stage-1 Butterfly, the $128^{th}$ symbol is required to be read from Mem2 and provided to the data lane 2 for the Stage-1 Butterfly . . . , the $448^{th}$ symbol is required to be read from Mem7 and provided to the data lane 7 for the Stage-1 Butterfly. To allow for this occurrence, the RCS needs to be performed on every $8^{th}$ cycle to shift the data output from one data lane to an adjacent data lane. An RCS on original data lane 7, for example, will shift the symbol to shifted data lane 0, the symbol on original data lane 0 will shift the symbol to shifted data lane 1.

Figure 7A:
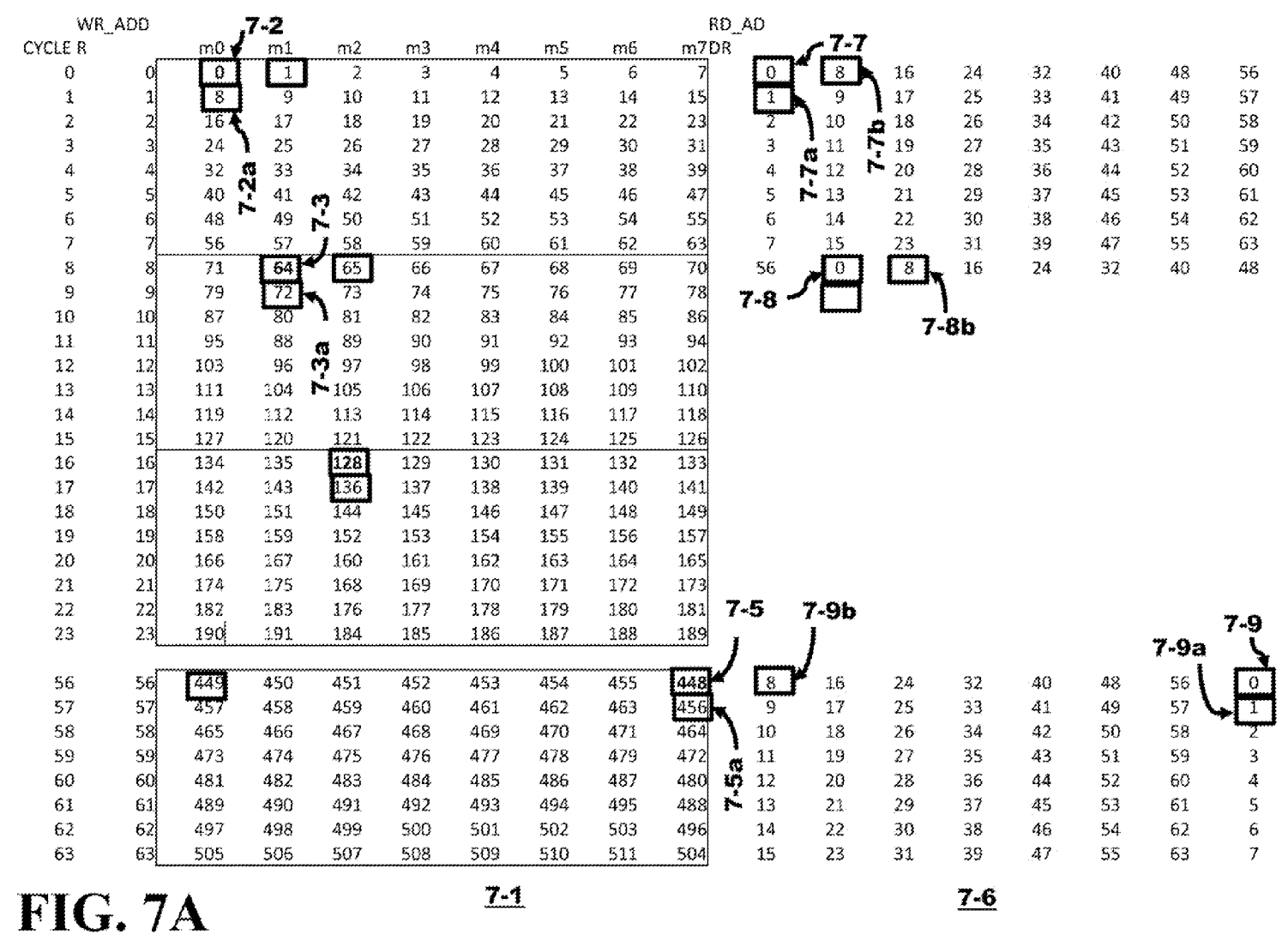

See the write table 7-1 in FIG. 7A, the $0^{th}$ symbol 7-2 is written into Mem0 (m0), the $64^{th}$ symbol 7-3 is written into Mem1 (m1) after a RCS, the $128^{th}$ symbol 7-4 is written into Mem2 (m1) after another RCS, and the 448' symbol 7-5 is written into Mem7 (m7) after the last RCS. Since the RCS changes every $8^{th}$ cycle, the RCS can be made dependent on when the triplet SCT changes such that these symbols can be shifted from the original data lanes into the shifted data lanes at the correct cycle and written into the correct memory.

Figure 7B:
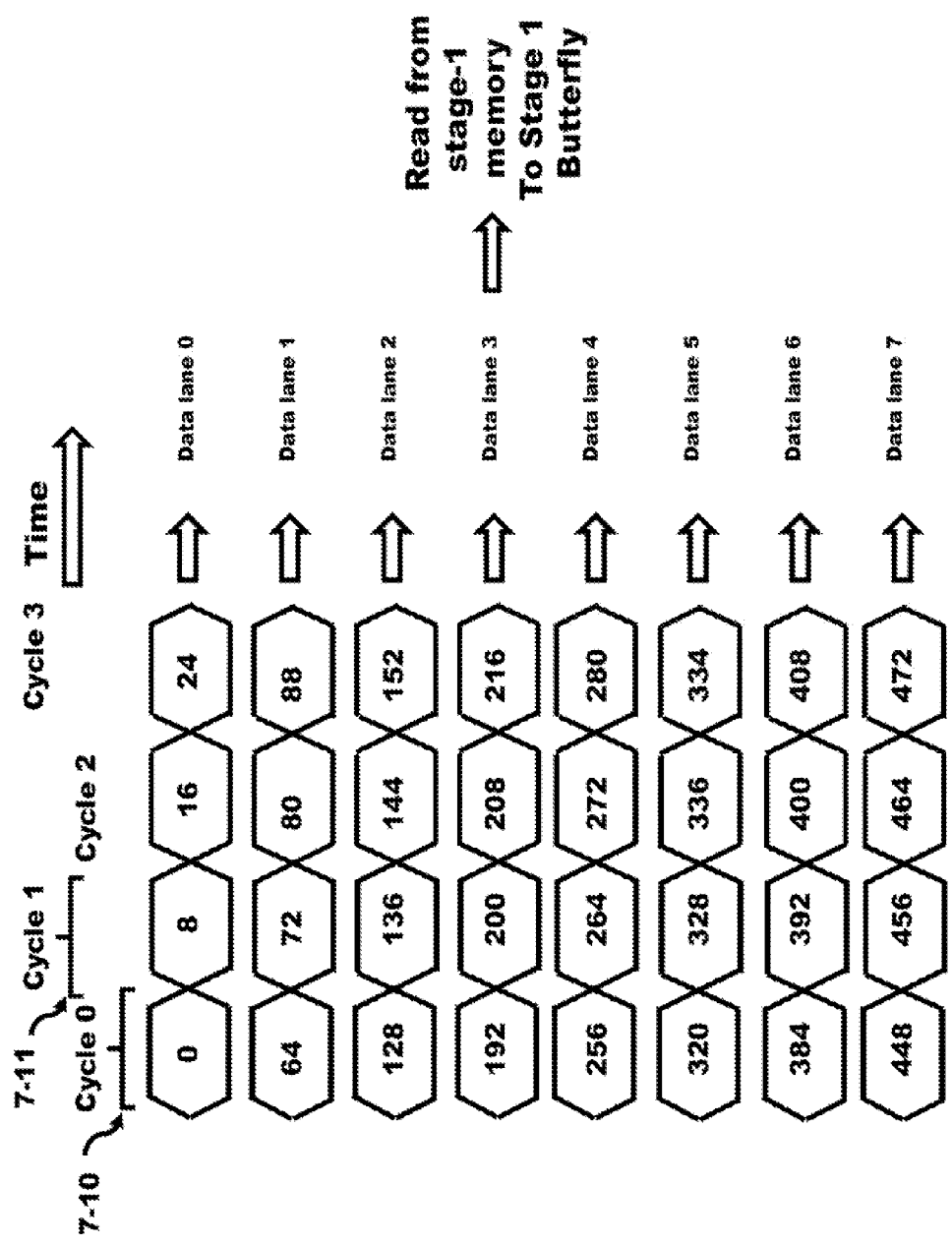
FIG. 7B presents a timing diagram of data read from Stage-1 memory bank and presented to the Stage 1 Butterfly in accordance with an embodiment of one of the present inventions.

The sequence TT, FCT, and SCT which is called the pattern-1 sequence is used to read the symbols from the Stage-1 memory bank. For this case, the combination of the TT and FCT triplets is selected to represent the counter value and is defined as the first combination. The TT and FCT triplets are used to calculate the value of the addressing scheme. Note that to calculate the value of this counter, the bits in the triplet has the weights [256, 128, 64] and [32, 16, 8]. Since the TT triplet is associated with the identity of the memory (see Table 2), the TT does not change over time. The FCT triplet derived from the three less significant outputs of a conventional counter cycle through the values [000], [001], [010], [011], [100], [101], [110], [11], [000], [001], etc. In a conventional count, these values would be 0, 1, 2, 3, 4, 5, 6, 7, 0, 1, respectively. However, the position of the FCT triplet in the pattern-1 sequence commands the weights [32, 16, 8]; therefore, the generated values of first combination would be 0, 8, 16, 24 . . . 56, 0, 8, 16 . . . for Mem0, repeating the pattern every 8 clock cycles. The corresponding bit sequence is or [000 000], [000 001], [000 010], [000 011] . . . [000 111], [000 001], [000 010] . . . since the FCT carries the weight of the conventional bit positions of: the 5, 4, and $3^{rd}$ bits. Note that the simultaneous addresses applied to Mem1 will be 64, 72, 80, 88 . . . 120, 64, 72, 80 . . . for Mem1, repeating the pattern every 8 clock cycles. Also, note that the simultaneous addresses applied to Mem7 will be 448, 456, 464, 472 . . . 504, 448, 456, 464 . . . for Mem7, repeating the pattern every 8 clock cycles. These addresses (which also correspond to the symbol position) are applied to each of the memories and are separated by a value of 64 and access each of the memories at the relative position 0 (see the read table 7-6 in FIG. 7A): Mem0 7-7, Mem1 7-8 . . . Mem7 7-9. The corresponding values from memory or symbol positions (indices) are 0 7-2, 64 7-3 . . . 448 7-5, respectively. Thus, during a read in cycle 0, the 8 data lanes comprises the symbol indices of 0, 64, 128, 192, 256, 320, 384, 448 as illustrated in FIG. 7B cycle 0 7-10 and FIG. 7C cycle 0 7-10. During cycle 1, the read is at the position 1 (see the read table 7-6 in FIG. 7A): Mem0 7-7a . . . Mem7 7-9a. The corresponding values are 8 7-2a, 72 7-3a, 136 . . . 456 7-5a, respectively. Thus, during a read in cycle 1, the 8 data lanes carry the symbol indices comprising 8, 72, 136, 200, 264, 328, 392, 456 as illustrated in FIG. 7B cycle 1 7-11 and FIG. 7C cycle 1 7-11. This process continues until the $8^{th}$ cycle, at this point the bit sequence repeats the pattern. The SCT triplet is monitored for a change and the change occurs on the $8^{th}$ cycle. Now the read is right circular shifted (RCS) to be read from the next adjacent memory to access the $8^{th}$ position in each memory, see 7-7b, 7-8b . . . , 7-9b in table 7-6, such that the corresponding values are 1, 65 . . . , 449, see table 7-1. Also see the $8^{th}$ cycle 7-12 in FIG. 7C. This sequence continues until the 63rd cycle where all of the 512 symbols are provided to the Stage-1 butterfly (see FIG. 7C) in the proper sequence.

Figure 8:
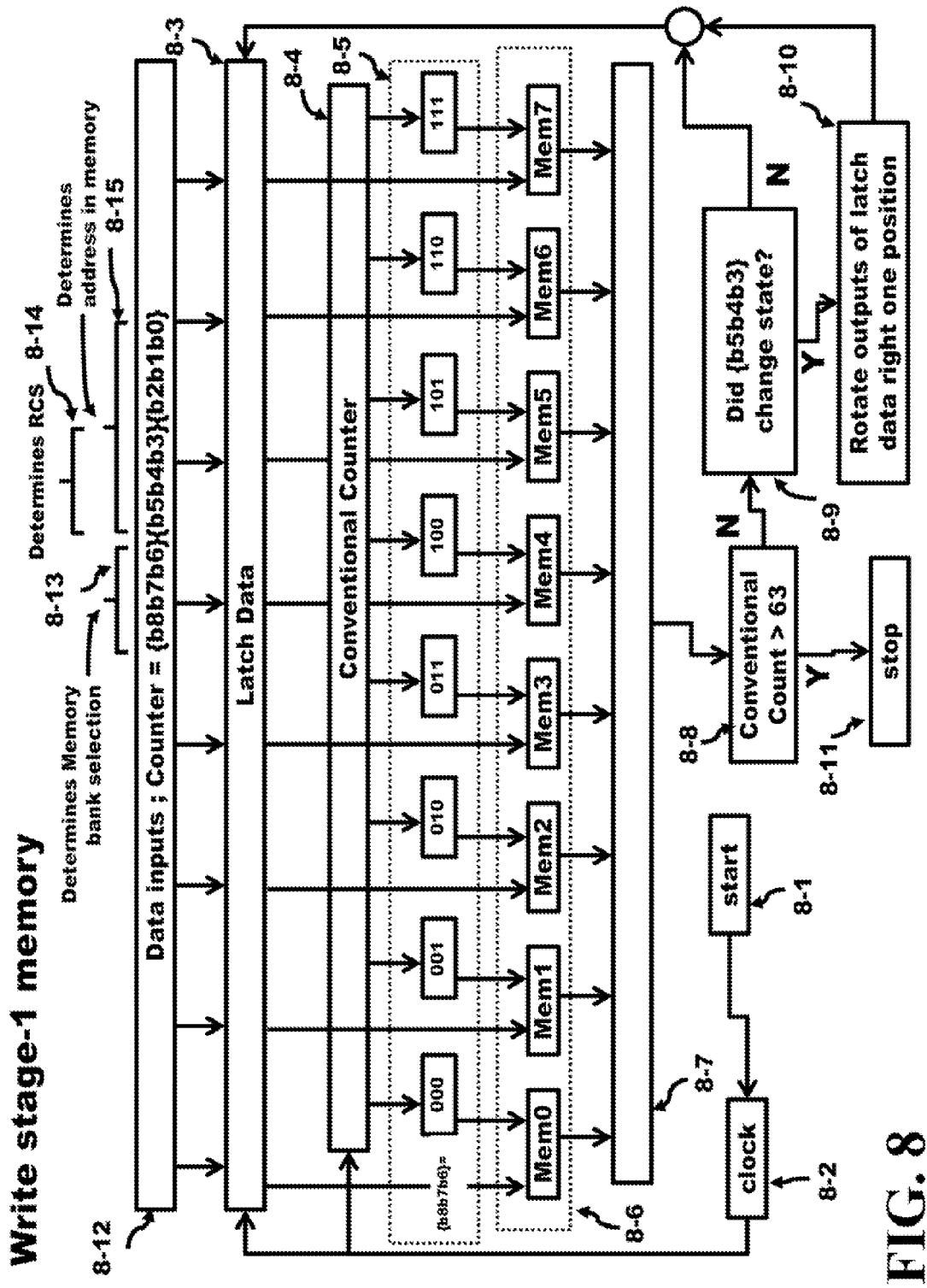
FIG. 8 depicts a block diagram of writing into the Stage-1 memory bank in accordance with an embodiment of one of the present inventions.

FIG. 8 illustrates a block diagram of the write operation for the Stage-1 memory bank. As the TB of symbols is applied to the Stage-1 memory bank, the process is started 8-1 and generates the clock 8-2. The clock is used to control the operation of the PE including the data inputs 8-12, the latches 8-3, and the conventional counter 8-4. The write Stage-1 memory bank uses the pattern-O sequence in given in Table 3. The TT triplet 8-13 is used to determine the memory bank selection 8-5 and 8-6. The SCT triplet 8-14 is used to determine the RCS while the SCT and FCT triplets 8-15 determine the address in memory. After a memory write, a check of the count being greater than 63 8-8 is performed. If not, a check is made if the SCT triplet changed state 8-9. If true, rotate outputs of the latch data right one position 8-10 and move to latch data 8-3. The block 8-7 is issued a command to perform the RCS function. Otherwise, if not true, bypass 8-10 and move to latch data 8-3. The check of the count being greater than 63 8-8 is performed. If true, all 512 symbols have been stored and stop 8-11. The next TB of symbols can then be processed.

Figure 9:
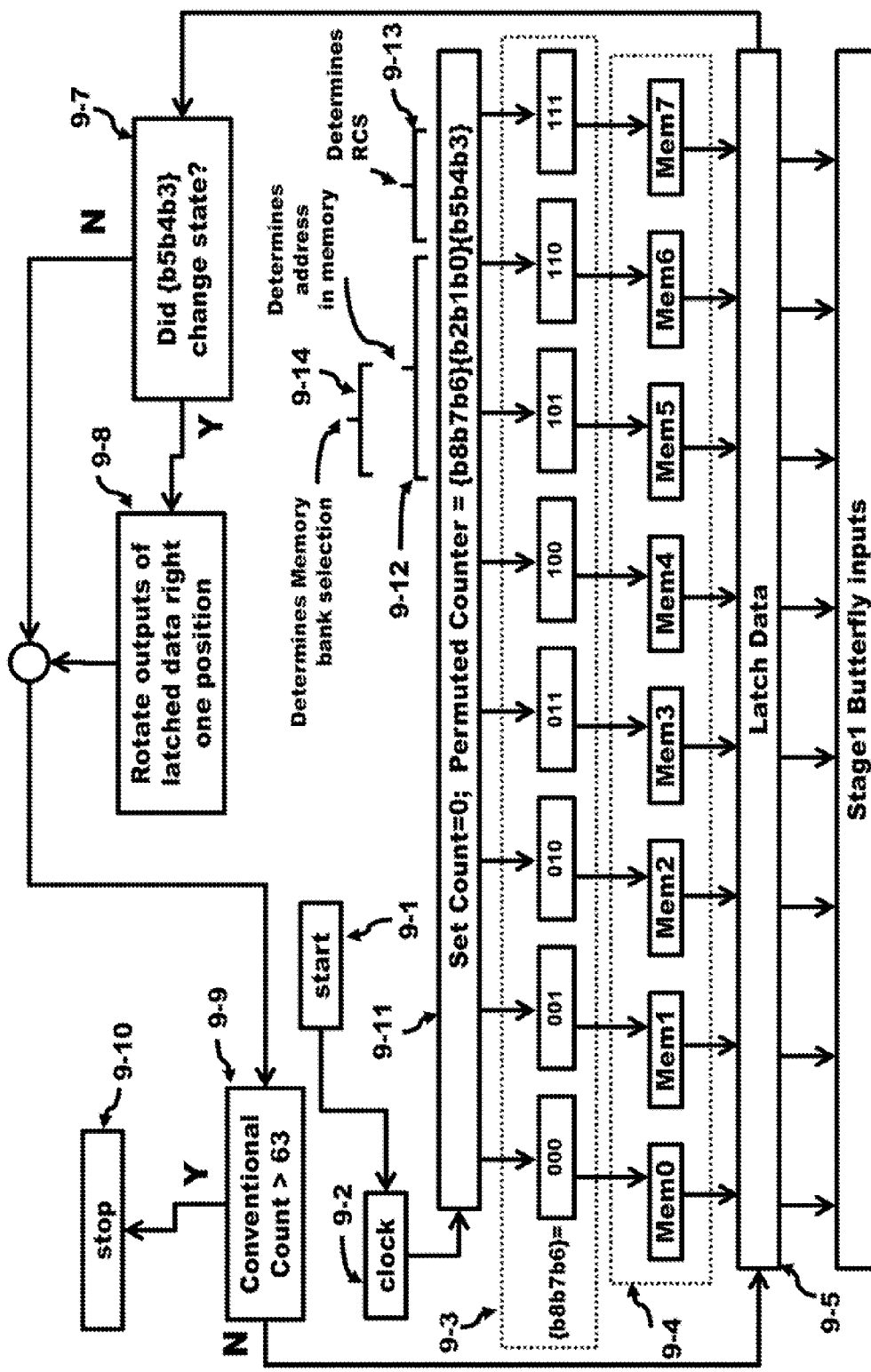
FIG. 9 illustrates a block diagram of reading out of the Stage-1 memory bank in accordance with an embodiment of one of the present inventions.

FIG. 9 illustrates a block diagram of the read operation for the Stage-1 memory bank. After the TB of symbols has been written into memory, the process starts 9-1 generating the clock 9-2. The clock is used to control the operation of the PE including the permuted counter 9-11 to access the data inputs in the memory bank 9-4 and the latches 9-5. The permuted counter 9-11 uses the pattern-1 sequence in given in Table 3. The TT triplet 9-14 is used to determine the memory bank selection 9-3 and 9-4. The SCT triplet 9-13 is used to determine the RCS while the TT and FCT triplets 9-12 are used to determine the address in memory. After a memory read, a check is made if the SCT triplet changed state 9-7. If true, rotate outputs of the latch data right one position 9-5 and check if the conventional count is greater than 63 9-8. If not, move to latch data 9-5 and send data to the Stage-1 Butterfly 9-6. Check if SCT changed state 9-7, if not, check if the conventional count to determine if the number of cycles is greater than 63 9-8. If true, all 512 symbols have been applied to the Stage-1 Butterfly 9-6 and stop 9-10. The next TB of symbols can then be processed.

Figure 7C:
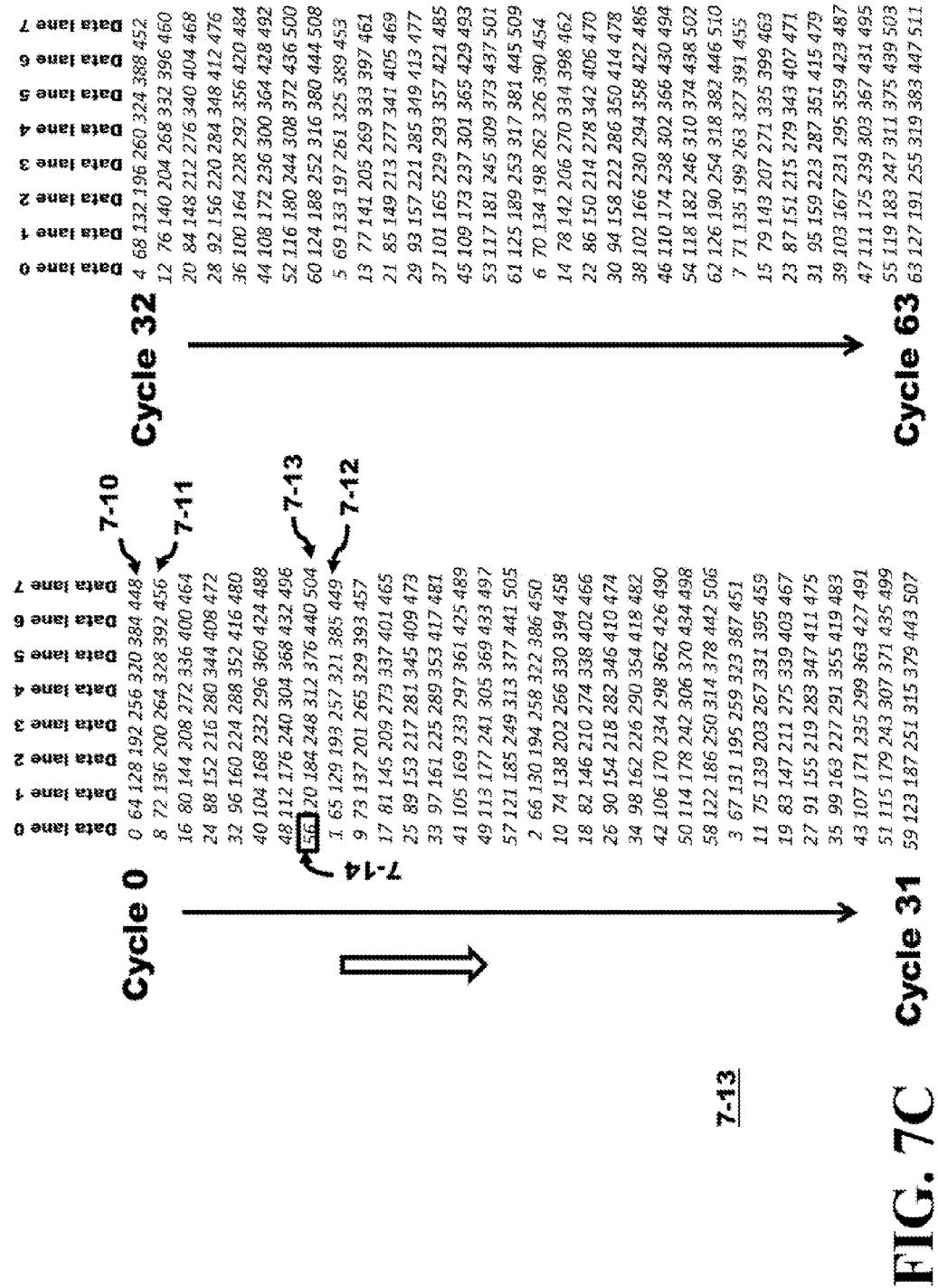
FIG. 7C provides the output subcarrier indices for Stage-1 Radix-8 butterfly in accordance with an embodiment of one of the present inventions.
Figure 10A:
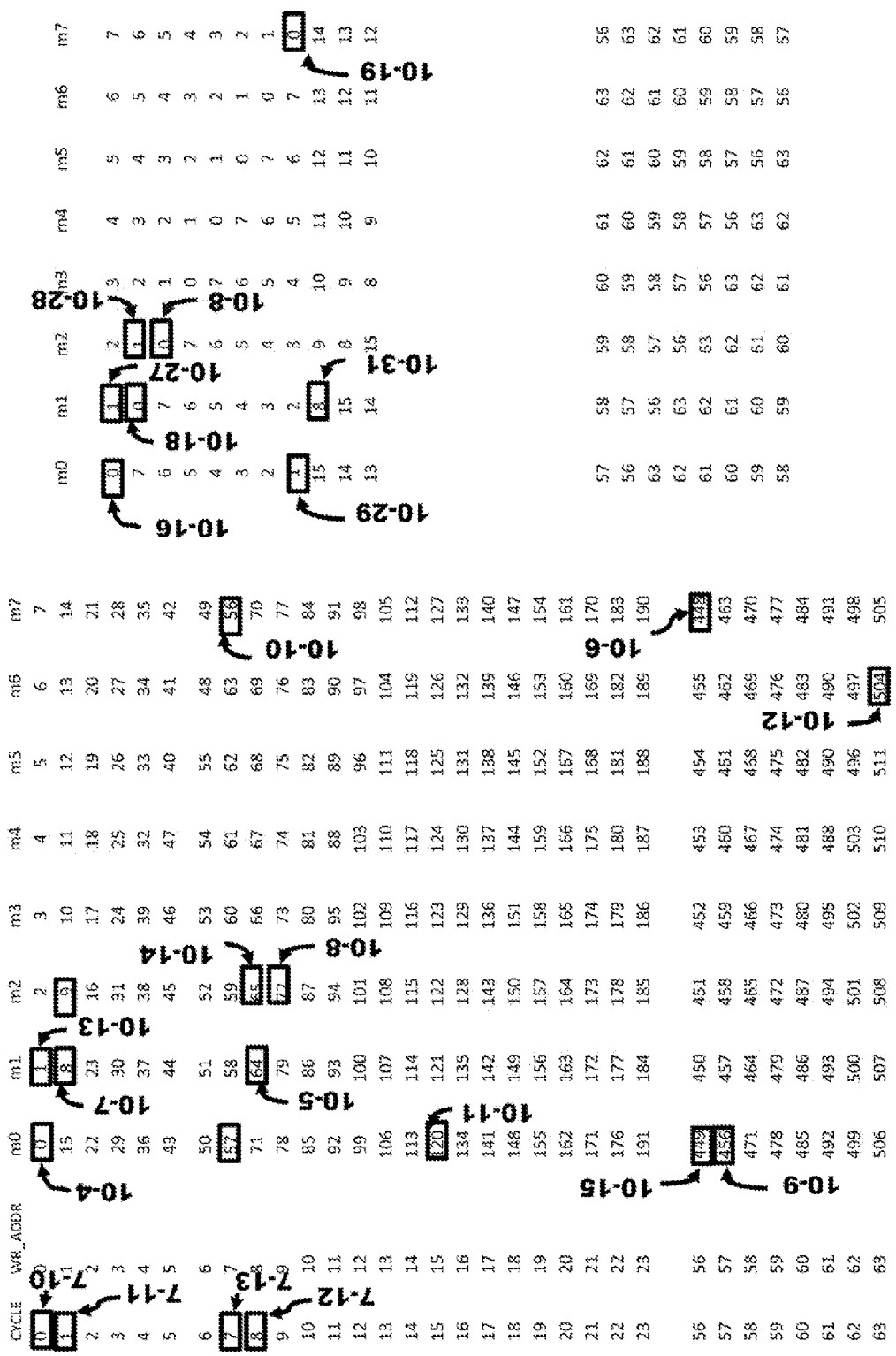
FIG. 10A depicts a write and read memory table for the Stage-2 Radix-8 butterfly in accordance with an embodiment of one of the present inventions.

The sequence TT, FCT, and SCT which is called the pattern-1 sequence is used to write the data from the Stage-1 Butterfly into the Stage-2 memory bank. For this case, the combination of the TT and FCT triplets is selected to represent the counter value and is defined as the first combination. The TT and FCT triplets are used to calculate the value of the addressing scheme. Note that to calculate the value of this counter, the bits in the triplet has the weights [256, 128, 64] and [32, 16, 8]. Since the TT triplet is associated with the identity of the memory (see Table 2), the TT does not change over time. The FCT triplet derived from the three less significant outputs of a conventional counter cycle through the values [000], [001], [010], [011], [100], [101], [110], [111], [000], [001], etc. In a conventional count, these values would be 0, 1, 2, 3, 4, 5, 6, 7, 0, 1, respectively. However, the position of the FCT triplet in the pattern-1 sequence commands the weights [32, 16, 8]; therefore, the generated values of first combination would be 0, 8, 16, 24 . . . 56, 0, 8, 16 . . . for Mem0, repeating the pattern every 8 clock cycles. The corresponding bit sequence is or [000 000], [000 001], [000 010], [000 011] . . . [0001], [000 001], [000 010] . . . since the FCT carries the weight of the conventional bit positions of: the 5, 4, and $3^{rd}$ bits. Note that the simultaneous addresses applied to Mem1 will be 64, 72, 80, 88 . . . 120, 64, 72, 80 . . . for Mem1, repeating the pattern every 8 clock cycles. Also, note that the simultaneous addresses applied to Mem7 will be 448, 456, 464, 472 . . . 504, 448, 456, 464 . . . for Mem7, repeating the pattern every 8 clock cycles. The write is partitioned by 64 for each memory and writes into each memory the contents of cycle 0 7-10 (see the first cycle in FIG. 7C and the write table 10-1 in FIG. 10A). For the data output from the Stage-1 Butterfly on cycle 0 (see FIG. 7C) 7-10: the 0 of the butterfly output on data lane 0 is written into location 0 of Mem0 10-4 on data lane 0, the 64 of butterfly output on data lane 1 is written into location 64 of Mem1 10-5 on data lane 1 . . . the 448 of butterfly output on data lane 7 is written into location 448 of Mem7 10-6 on data lane 7. For the data output from the Stage-1 Butterfly on cycle 1 (see FIG. 7C) 7-11: the 8 of the butterfly output on data lane 0 is written into location 8 of Mem1 10-7 on data lane 1, the 72 of butterfly output on data lane 1 is written into location 72 of Mem1 10-8 on data lane 2 . . . the 456 of butterfly output on data lane 7 is written into location 456 of Mem0 10-9 on data lane 0. For the data output from the Stage-1 Butterfly on cycle 7 (see FIG. 7C) 7-13: the 56 of the butterfly output on data lane 0 is written into location 56 of Mem7 10-10 on data lane 7, the 120 of butterfly output on data lane 1 is written into location 120 of Mem0 10-11 on data lane 0 . . . the 504 of butterfly output on data lane 7 is written into location 504 of Mem0 10-12 on data lane 6. For the data output from the Stage-1 Butterfly on cycle 8 (see FIG. 7C) 7-12: the 1 of the butterfly output on data lane 0 is written into location 0 of Mem1 10-13 on data lane 1, the 65 of the butterfly output on data lane 1 is written into location 64 of Mem2 10-14 on data lane 2 . . . the 449 of butterfly output on data lane 7 is written into location 448 of Mem0 10-15 on data lane 0. In cycle 1 7-11, the FCT triplet is used to determine the RCS which occurs every cycle. All of the data lanes out of the butterfly are therefore shifted one position to the right before being written into memory cycle. For example, the 56 7-14 in data lane 0 in FIG. 7C, is shifted right 7 places and the 56 10-10 is written into Mem7 on data lane 7.

Figure 10B:
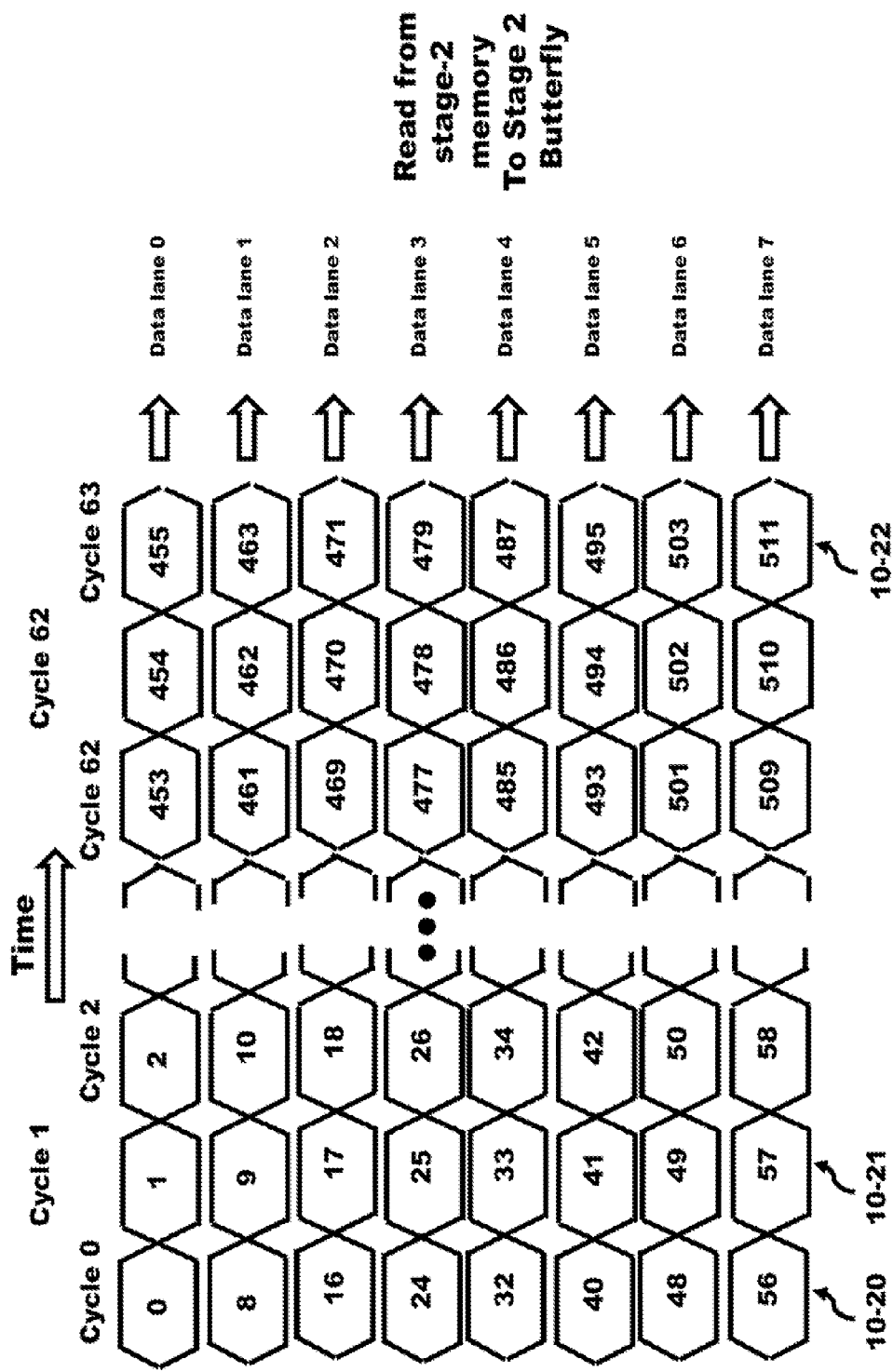
FIG. 10B presents a timing diagram of data read from Stage-2 memory bank and presented to the Stage-2 Radix-8 Butterfly in accordance with an embodiment of one of the present inventions.
Figure 10C:
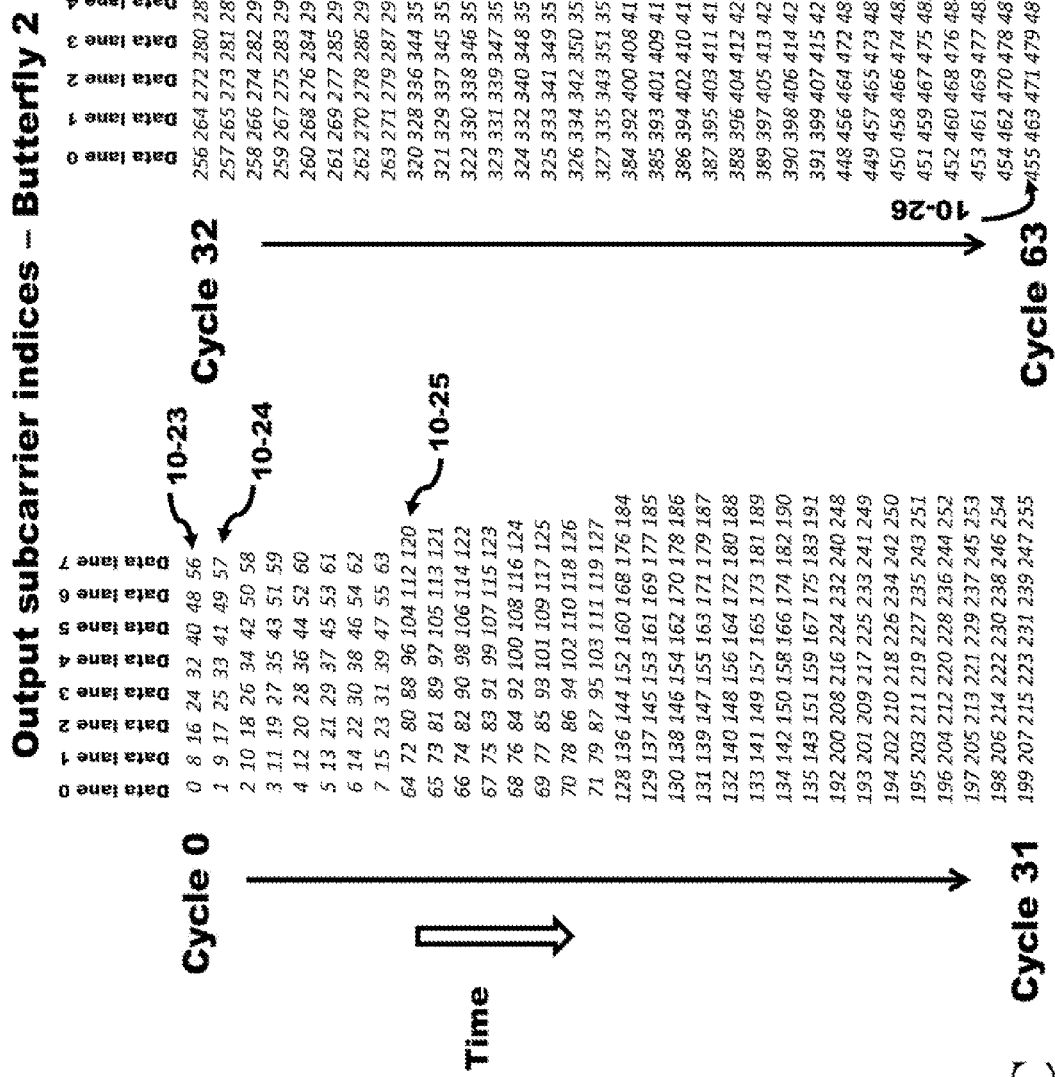
FIG. 10C provides the output subcarrier indices for Stage-2 Radix-8 butterfly in accordance with an embodiment of one of the present inventions.

The sequence SCT, TT, and FCT which is called the patent-2 sequence is used to read the symbols from the Stage-1 memory bank. For this case, the combination of the SCT and TT triplets is selected to represent the counter value and is defined as the second combination. The SCT and TT triplets are used to calculate the value of the addressing scheme. Note that to calculate the value of this counter, the bits in the triplet has the weights [256, 128, 64] and [32, 16, 8]. Since the TT triplet is associated with the identity of the memory (see Table 2), the TT does not change over time. The SCT triplet derived from the three most significant outputs of a conventional 6-bit counter cycle through the values, each sequence 8 times: [000] . . . [000], [001] . . . [001], [010] . . . [010], [011] . . . [011], [100] . . . [100], [101] . . . [101], [110] . . . [110], [110] . . . [111], [000] . . . [000], [001] . . . [001], etc. For Mem0, the TT triplet is [000] and the sequence would be 0, 0, 0, 0 . . . 0, 64, 64, 64 . . . , 128, 128, 128 . . . , 192, 192, 192 . . . for Mem0, repeating 8 times then increasing by 64. The FCT carries the weight of the conventional bit positions of: the 2nd, 1st, and 0th bits, but is not used to determine the address. Note that the simultaneous addresses applied to Mem1 will be 8, 8, 8, 8 . . . 8, 72, 72, 72 . . . , 136, 136, 136 . . . , 200, 200, 200 . . . for Mem1, repeating 8 times then increasing by 64. Also, note that the simultaneous addresses applied to Mem7 will be 56, 56, 56, 56 . . . 56, 120, 120, 120 . . . for Mem7, repeating 8 times then increasing by 64. The access is separated by 8 for each memory and accesses each memory during cycle 0 at the positions 0 (see the read table 10-2 in FIG. 10A): Mem0 10-16, Mem1 10-18 . . . Mem7 10-19. The corresponding symbols are illustrated in the table 10-1 and are 0 10-4, 8 10-7 . . . 56 10-10, respectively. Thus, during a read in cycle 0, the 8 data lanes comprises 0, 8, 16, 24, 32, 40, 48, and 56 as illustrated in FIG. 10B cycle 0 10-20 and FIG. 10C cycle 0 10-23. A RCS occurs every cycle based on the FCT triplet so the data lane connections are shifted right by one. The access is separated by 8 for each memory and accesses each memory during cycle 1 at the positions 1 (see the read table 10-2 in FIG. 10A): Mem0 10-27, Mem1 10-28 . . . Mem7 10-29. The corresponding symbols are illustrated in the table 10-1 and are 1 10-13, 9 10-7 . . . 57 10-31, respectively. Thus, during a read in cycle 1, the 8 data lanes comprises 1, 9, 17, 25, 33, 41, 49, and 57 as illustrated in FIG. 10B cycle 1 10-21 and FIG. 10C cycle 1 10-24. Entering cycle 8, the RCS occurs due to the FCT triplet changing and another RCS occurs due to the SCT changing, so the data lane connections are shifted right by two (see the read table 10-2 in FIG. 10A): Mem1 10-31 and compare to the last read in Mem7 10-19. The corresponding values are 64 10-5, 72 10-8, 80 . . . 120 10-11, respectively. Thus, during a read in cycle 8, the 8 data lanes comprise 64, 72, 80, 88, 96, 104, 112, and 120 as illustrated in FIG. 10C cycle 8 10-25. This process continues until all 512 symbols are read, at this point the one TB has been read providing all 512 symbols to the Stage-2 butterfly.

Figure 11:
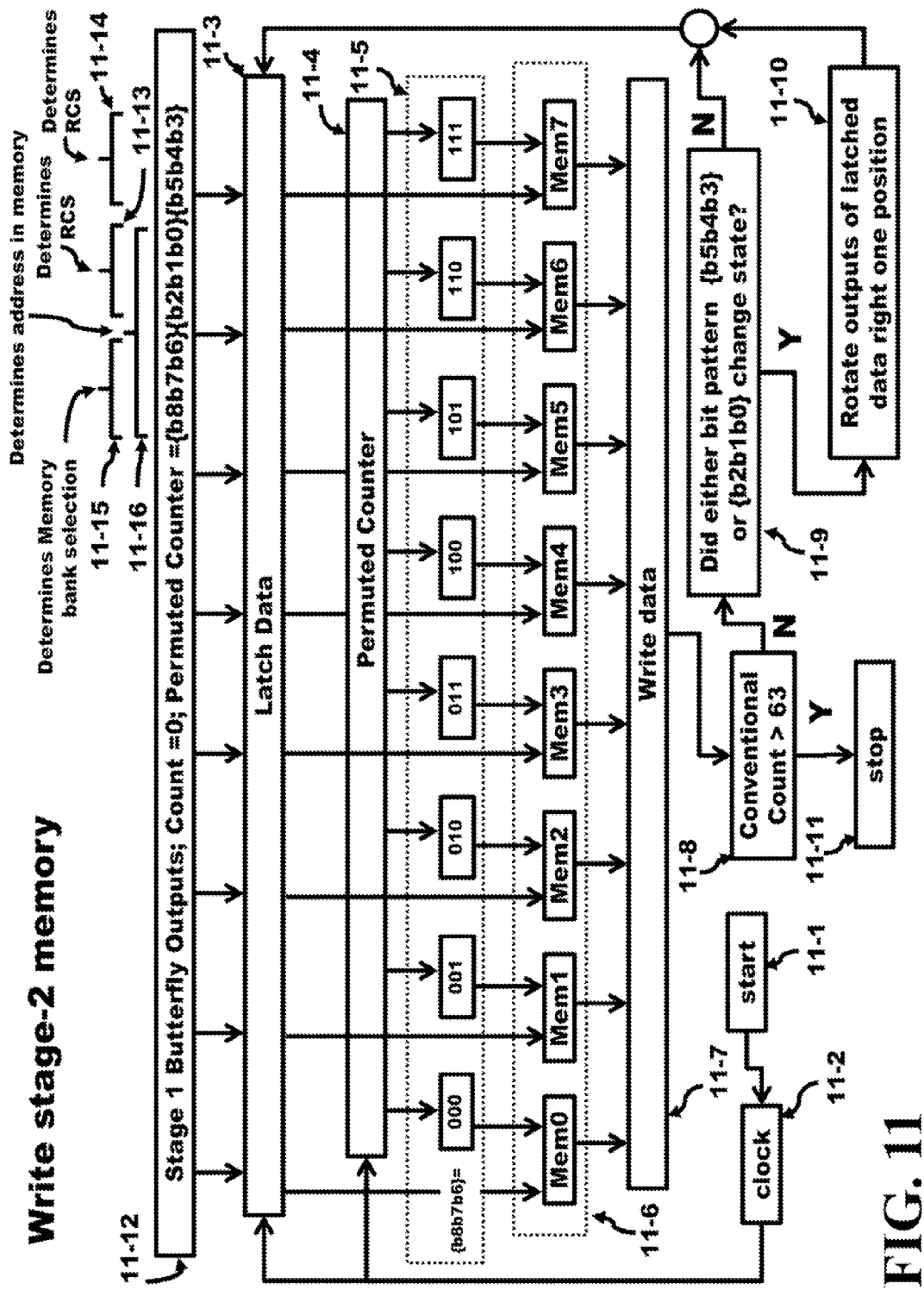
FIG. 11 depicts a block diagram of writing into the Stage-2 memory bank in accordance with an embodiment of one of the present inventions.

FIG. 11 illustrates a block diagram of the write operation for the Stage-2 memory bank. The process starts 11-1 generating the clock 11-2. The clock is used to control the operation of the PE including the data inputs 11-12, the latches 11-3, and the permutated counter 11-4. The write Stage-2 memory bank uses the pattern-1 sequence in given in Table 3. The TT triplet 11-13 determines the memory bank selection 11-5 and 11-6. The SCT triplet 11-14 and the FCT triplet 11-13 determine the RCS while the TT and FCT triplets 11-16 determine the address in memory. After writing data, a check of the count being greater than 63 11-8 is performed. If not, a check is made if either the SCT triplet or FCT changed state 11-9. If true, rotate outputs of the latch data right one position 11-10 and move to latch data 11-3. The block 11-10 is set up to perform the RCS function. Otherwise, if not true, bypass 11-10 and move to latch data 11-3. After writing data, a check of the count being greater than 63 11-8 is performed. If true, all 512 symbols have been stored and stop 11-11. The next TB of symbols can then be processed.

Figure 12:
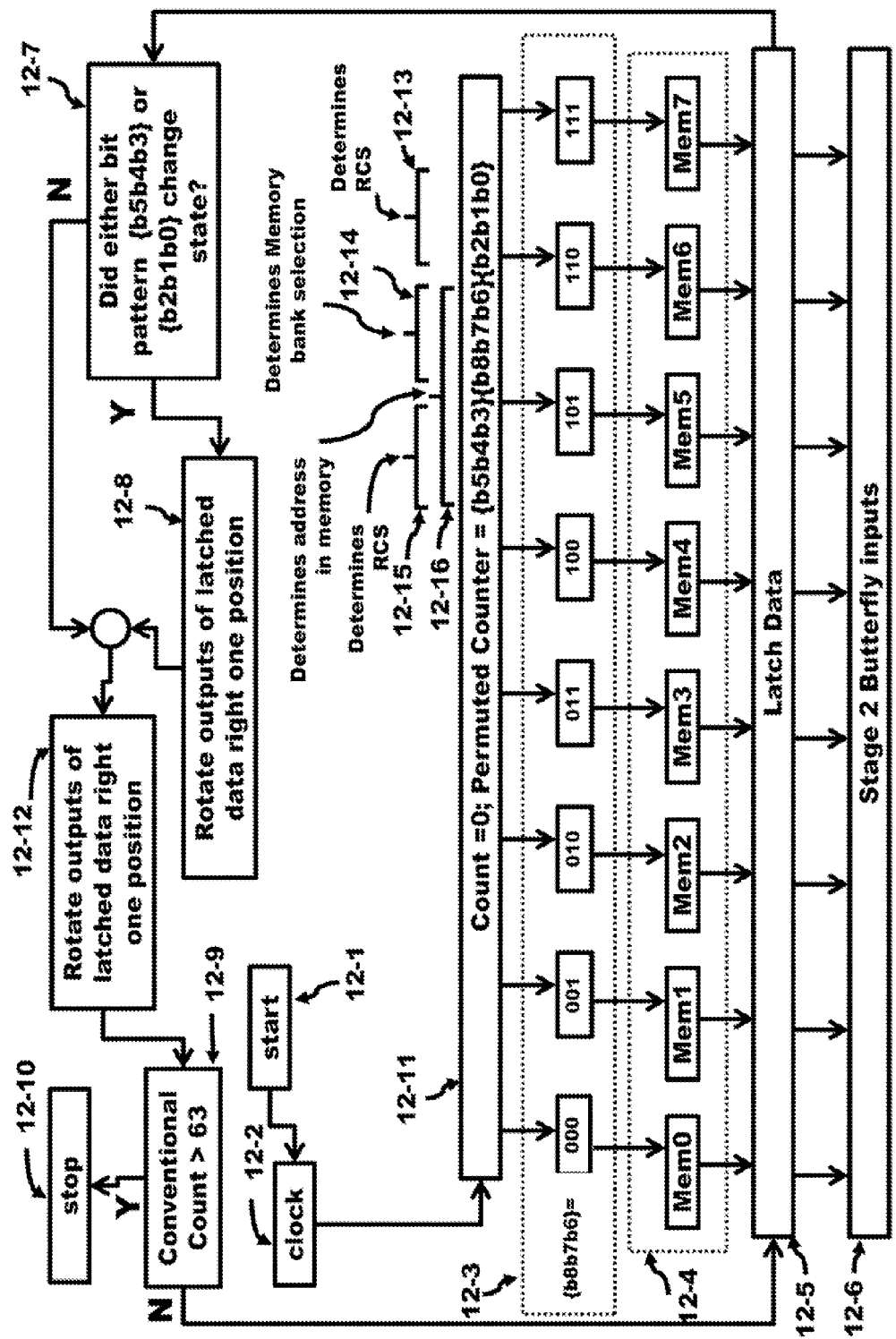
FIG. 12 illustrates a block diagram of reading out of the Stage-2 memory bank in accordance with an embodiment of one of the present inventions.

FIG. 12 illustrates a block diagram of the read operation for the Stage-2 memory bank. As the TB of symbols is applied to the Stage-2 memory bank, the process is started 12-1 and generates the clock 12-2 in FIG. 11. The clock is used to control the operation of the PE including the permuted counter 12-11 to access the data inputs in the memory bank 12-4 and the latches 12-5. The permuted counter 12-11 uses the pattern-2 sequence in given in Table 3. The TT triplet 12-14 determines the memory bank selection 12-3 and 12-4. The SCT triplet 12-13 and the FCT triplet 12-13 determine the RCS while the SCT and TT triplets 12-16 determine the address in memory. After a memory read, a check is made if either the SCT or FCT triplets changed state 12-7. If true, rotate outputs of the latch data right one position 12-12 and check if the conventional count is greater than 63 12-9. If not, move to latch data 12-5 and send data to the Stage-2 Butterfly 12-6. Check if either the SCT or FCT triplets changed state 12-7, if not, check if the conventional count to determine if the number of cycles is greater than 63 12-9. If true, all 512 symbols have been applied to the Stage-2 Butterfly 12-6 and stop 12-10. The next TB of symbols can then be processed.

Figure 13A:
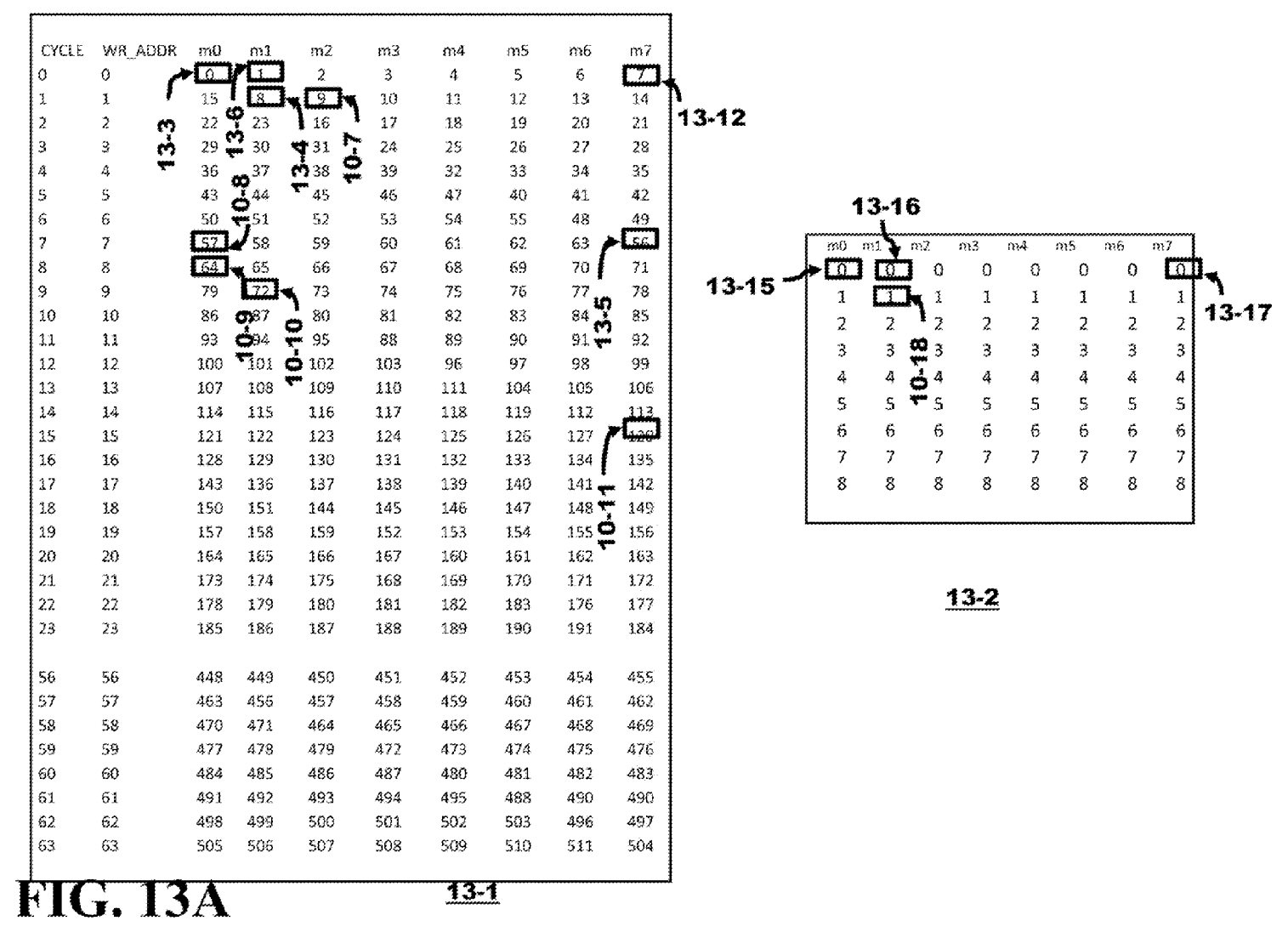

The sequence SCT, TT, and FCT which is called the pattern-2 sequence is used to write the data from the Stage-2 Butterfly into the Stage-3 memory bank. For this case, the combination of the SCT and TT triplets is selected to represent the counter value and is defined as the second combination, the values would be 0, 0, 0, 0 . . . 0, 64, 64, 64 . . . for Mem0, repeating 8 times then increasing by 64. The corresponding bit sequence is or [000 000], [000 000], [000 000], [000 000] . . . [000 000], [000 001], [000 010] . . . Note that the simultaneous addresses applied to Mem1 will be 8, 8, 8, 8 . . . 8, 72, 72, 72 . . . for Mem1, repeating the address 8 times then increasing by 64. Also, note that the simultaneous addresses applied to Mem7 will be 56, 56, 56, 56 . . . 56, 120, 120, 120 . . . for Mem7, repeating the address 8 times then increasing by 64. The write is separated by 8 for each memory and writes into memory during cycle 0 at the positions (see the write Table 13-1 in FIG. 13A) 0 13-3, 8 13-4 . . . 56 13-5. The FCT triplet causes a RCS every cycle and shifts the data lane one position to the right. The write is separated by 8 for each memory and writes into memory during cycle 1 at the positions (see the write Table 13-1 in FIG. 13A) 0 13-6 in Mem1, 8 13-7 in Mem2 . . . 56 13-8 in Mem0 of memories Mem1, Mem2 . . . Mem0, respectively. The symbols written during cycle 1 in Mem1, 9 in Mem2 . . . 15 in Mem0. The write is partitioned by 64 every $8^{th}$ cycle for each memory and writes into each memory in cycle 8 10-25 (see the 8th cycle in FIG. 10C and the write table 13-1 in FIG. 13A). For the data output from the Stage-2 Butterfly on cycle 8 (see FIG. 10C) 10-25: the 64 symbol of the butterfly output on data lane 0 is written into Mem0 13-9 on data lane 0, the 72 of butterfly output on data lane 1 is written into Mem1 13-10 on data lane 1 . . . the 120 of butterfly output on data lane 7 is written into Mem7 13-11 on data lane 7. All of the data lanes out of the butterfly are therefore shifted one position to the right before being written into memory cycle, except for cycle 0. For example, in cycle 8 10-25, the 120 symbol in data lane 7 in FIG. 10C, is shifted right 8 places (summed up from cycle 0-7) and is the 120 symbol 10-11 is written into Mem7 on data lane 7.

Figure 13B:
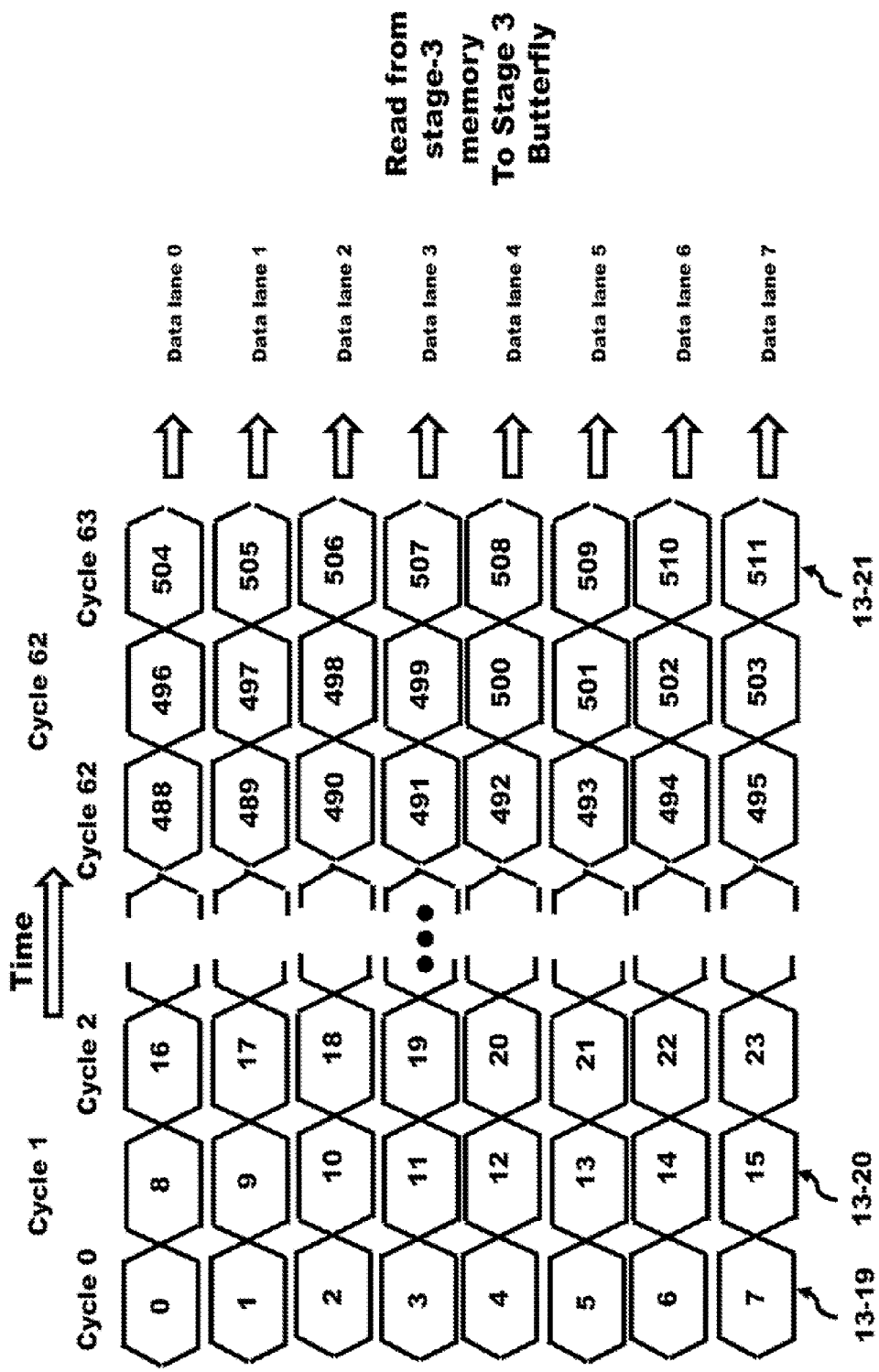
FIG. 13B shows a timing diagram of memory transfers for the Stage-3 Radix-8 butterfly in accordance with an embodiment of one of the present inventions.
Figure 13C:
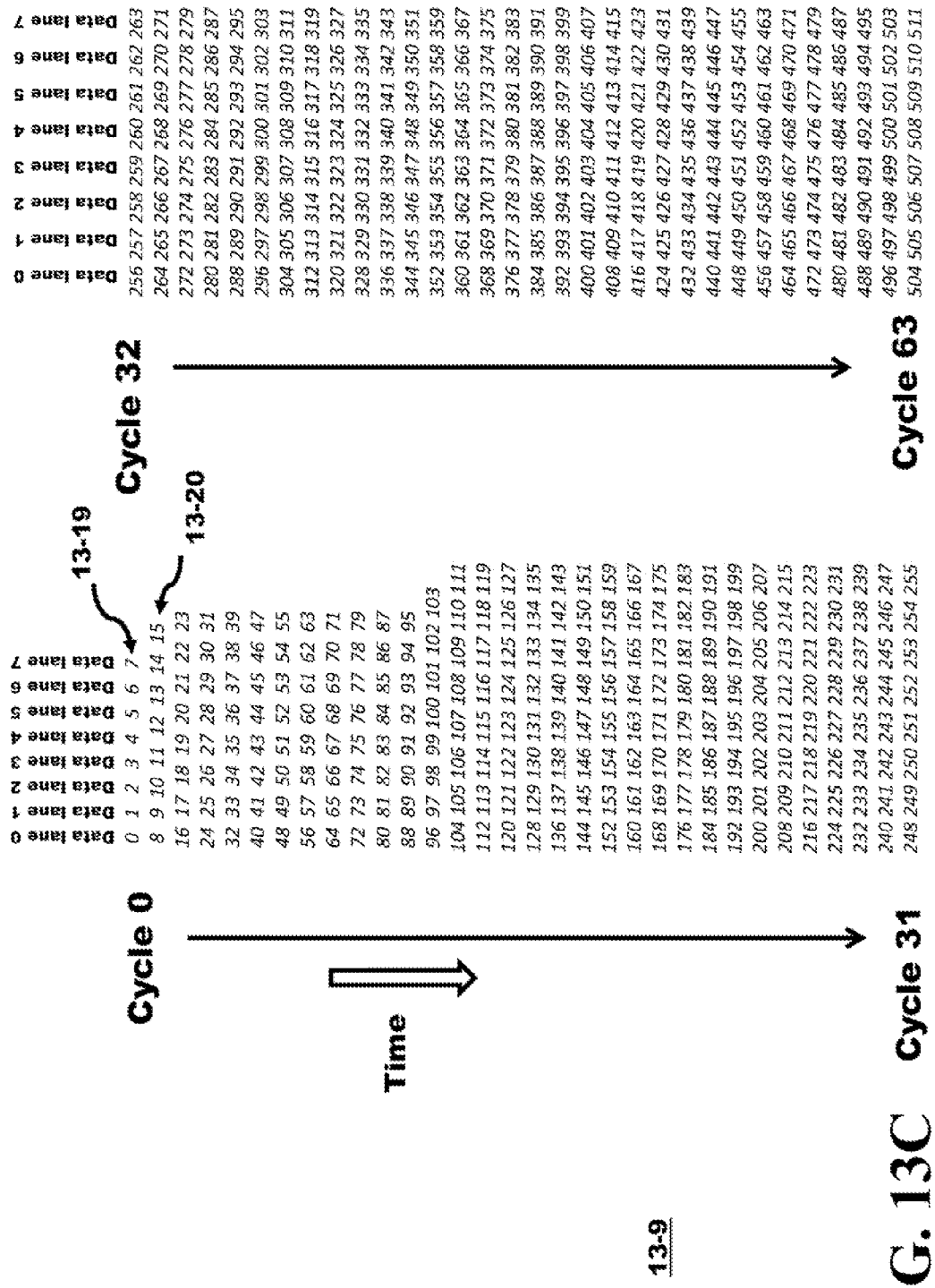
FIG. 13C depicts the output subcarrier indices for Stage-3 Radix-8 butterfly in accordance with an embodiment of one of the present inventions.

The read sequence for the Stage-3 memory bank uses SCT, FCT, and TT which is called the pattern-3 sequence. The FCT triplet is used to determine if a RCS occurred, Since the FCT changes every cycle, the RCS switches symbols on the data lane from the memory to an adjacent data lane coupled to the Stage-3 Butterfly every cycle. When only the SCT and FCT are read as a third combination, the address value of the pattern-3 sequence would be 0, 8, 16, 24 . . . , 56, 64, 72 . . . or [000 000], [000 001], [000 010], [000 011] . . . , [000 111], [001 000], [001 001], . . . Note these addresses will span the addresses ranging from 0-504 for Mem0. Thus, the address for Mem1, Mem2 . . . Mem7 would range from 1-505, 2-506 . . . 7-511, respectively (For the addresses of 0, 1 . . . 7, see 13-15, 13-16 and 13-17 in the read table 13-2). These addresses corresponds to the symbols 0 13-3, 1 13-6, and 7 13-12 in Table 13-1. On cycle 0, the contents of address 0 is presented to the data lanes 0-7. On cycle 1, the data lanes shift one unit to the right since the RCS is determined by FCT which changes every cycle. The contents of address 1 is presented to the data lanes 0-7, but since the FCT changed, the data lane 0 connects to data lane 1 (see 13-18 of Table 13-2), the data lane 1 connects to data lane 2, etc. On cycle 2, the contents of address 2 are presented to the data lanes 0-7, but since the FCT changed, the data lane 0 connects to data lane 2, and the data lane 1 connects to data lane 3, etc. After 64 cycles, all 64 symbols in each memory will be read providing a TB of 512 symbols to the Stage-3 Butterfly as illustrated in FIG. 13C. However, after every cycle, a RCS occurs since the FCT triplet is used to determine the RCS. The read table 13-2 illustrates the reading of all memories each sequential cycle. FIG. 13B and FIG. 13C shows cycle 0 13-19 having the symbols 0, 1, 2 . . . , 7, cycle 1 13-20 having the symbols 8, 9, 10 . . . , 15, and cycle 63 13-21 having the symbols 504, 505, 506 . . . , 511 presented to the Stage-3 Butterfly on data lanes 0-7.

Figure 14:
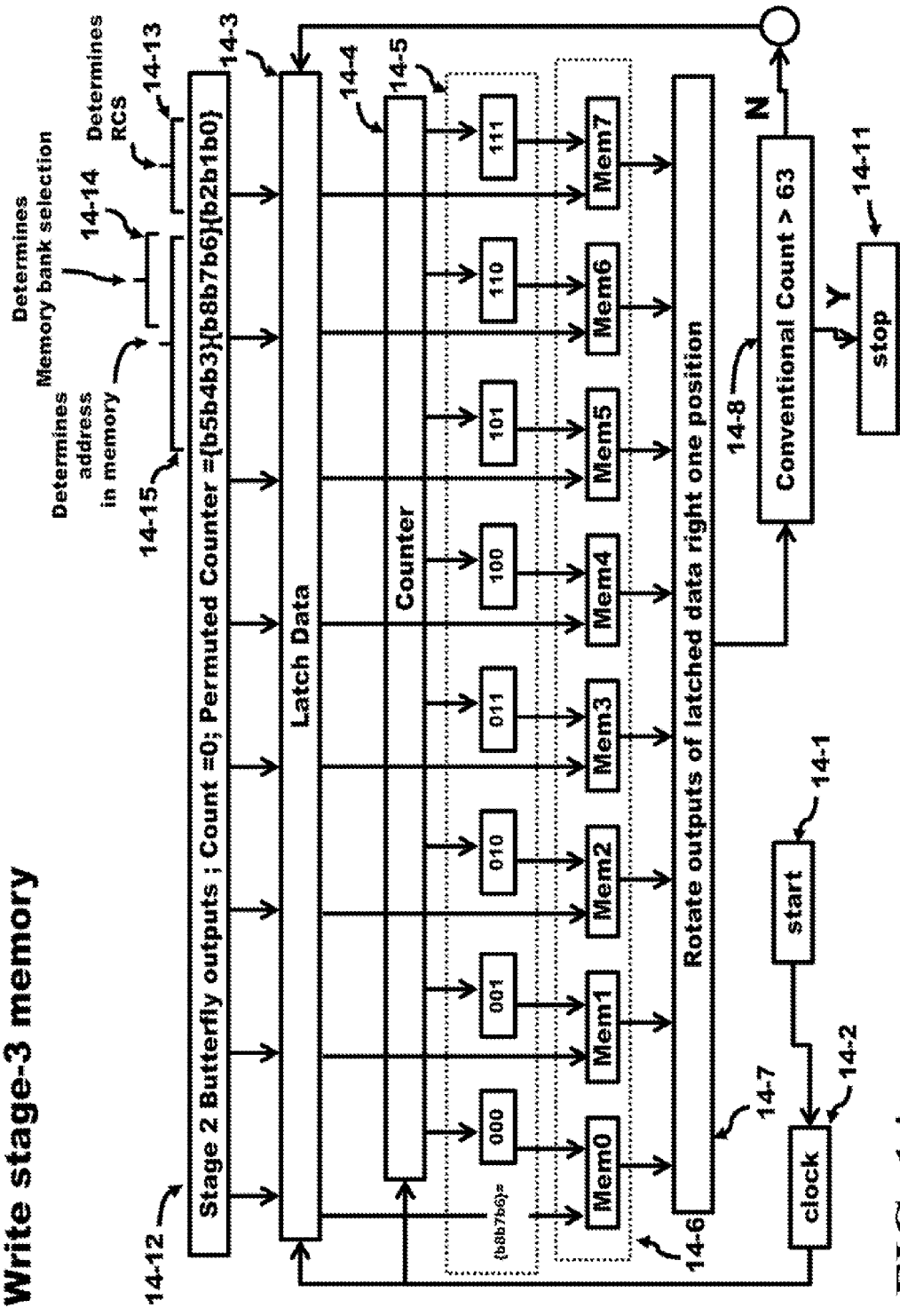
FIG. 14 depicts a block diagram of writing into the Stage-3 memory bank in accordance with an embodiment of one of the present inventions.

FIG. 14 illustrates a block diagram of the write operation for the Stage-3 memory bank. The process starts 14-1 generating the clock 14-2. The clock is used to control the operation of the PE including the data inputs 14-12, the latches 14-3, and the permutated counter 14-4. The write Stage-3 memory bank uses the pattern-2 sequence in given in Table 3. The TT triplet 14-14 determines the memory bank selection 14-5 and 14-6. The FCT triplet 14-13 determines the RCS, which occurs every cycle, while the SCT and TT triplets 14-15 determine the address in memory. After performing an RCS and writing the data into memory, a check of the count being greater than 63 14-8 is performed. After writing data, a check of the count being greater than 63 14-8 is performed. If true, all 512 symbols have been stored and stop 14-11. The next TB of symbols can then be processed.

Figure 15:
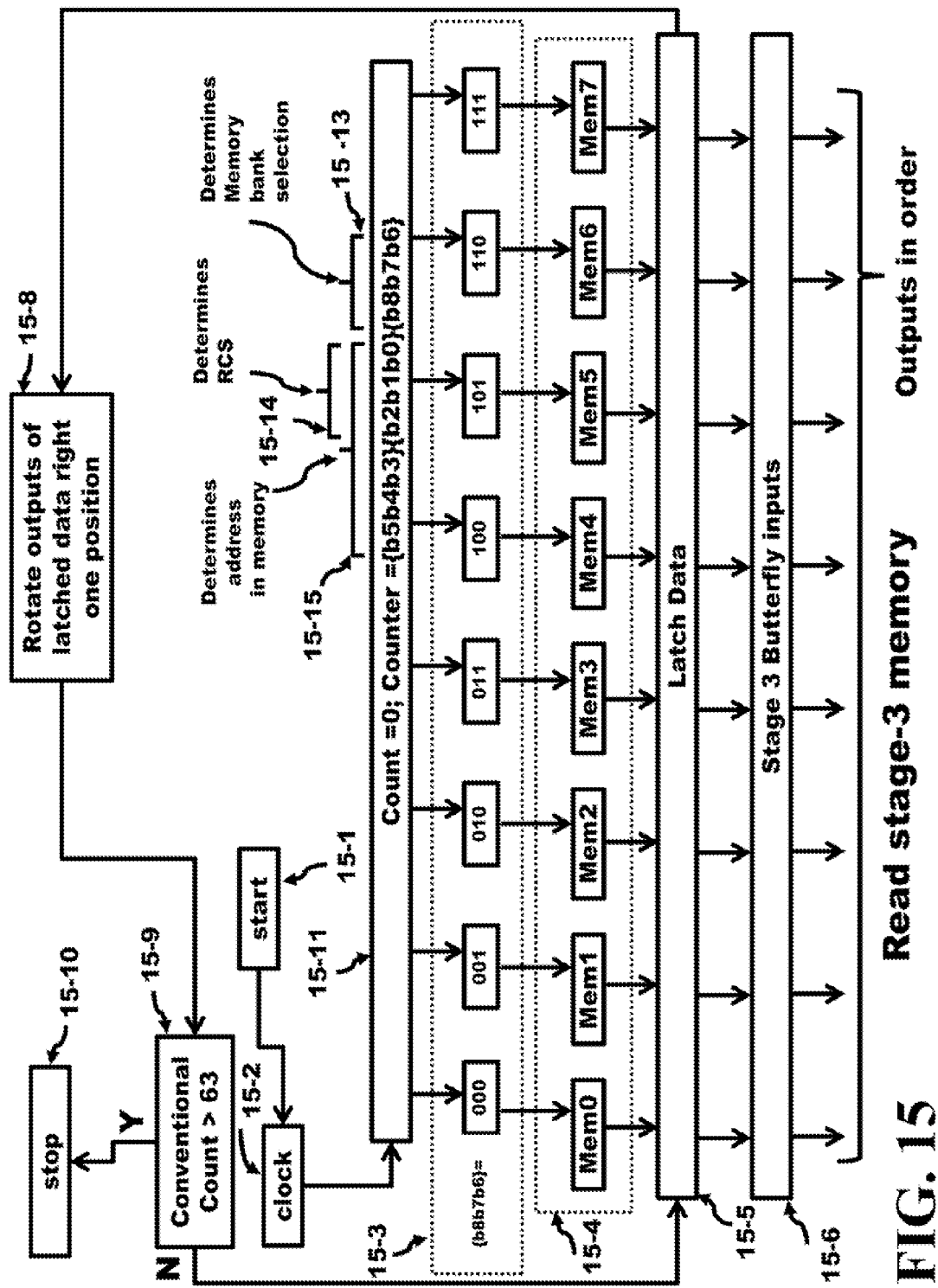
FIG. 15 illustrates a block diagram of reading out of the Stage-3 memory bank in accordance with an embodiment of one of the present inventions.

FIG. 15 illustrates a block diagram of the read operation for the Stage-3 memory bank. The process start 15-1 starts the clock 15-2 eight cycles after the 63rd cycle of clock 12-2 in FIG. 12. The clock is used to control the operation of the PE including the counter 15-11 to access the data inputs in the memory bank 15-4 and the latches 15-5. The counter 15-11 uses the pattern-3 sequence in given in Table 3. The TT triplet 15-13 determines the memory bank selection 15-3 and 15-4. The FCT triplet 15-14 determines the RCS while the SCT and FCT triplets 15-15 determine the address in memory. After a memory read, a check is made if FCT triplet changed state 15-7. Since it is always true, rotate outputs of the latch data right one position 15-8 and check if the conventional count is greater than 63 15-9. If not, move to latch data 15-5 and send data to the Stage-3 Butterfly 15-6. Check if the number of cycles is greater than 63 15-9. If true, all 512 symbols have been applied to the Stage-3 Butterfly 15-6 and stop 15-10. The next TB of symbols can then be processed.

A carrier frequency of 60 GHz is used to propagate a signal with a bandwidth of 1760 MHz. The symbol rate is 1/1760 MHz=0.5682 ns while the PHY is clocked at a frequency of 440 MHz (a period at 2.27 ns) to process 4 symbols (I, Q pairs) per cycle. The FFT's throughput is designed to process a TB (or 512 symbols) in 64 cycles or 290.92 ns/TB. Then 64 cycles of idle cycles occurs in-between TBs. The FFT expects an 8 symbol clock offset (SCO)/carrier frequency offset (CFO) symbols per cycle. Each set of 8 symbols are clocked at 440 MHz which is 8 sets of symbols/2.27 ns. Since the Transmission block (TB) has 512 bits, the total time to transfer these bits would be 512/8×8 symbol s/2.27 ns=145 ns. Due to the 64 idle cycles, the total time is 2×145 ns or 0.3 usec. The memory is required to hold the symbols which are divided into 8 sub-columns with 28/34 bits per column.

Finally, it is understood that the above descriptions are only illustrative of the principle of the current invention. Various alterations, improvements, and modifications will occur and are intended to be suggested hereby, and are within the spirit and scope of the invention. This invention may, however, be embodied in many different forms and should not be construed as limited to the embodiments set forth herein. Rather, these embodiments are provided so that the disclosure will be thorough and complete, and will fully convey the scope of the invention to those skilled in the arts. It is understood that the various embodiments of the invention, although different, are not mutually exclusive. In accordance with these principles, those skilled in the art may devise numerous modifications without departing from the spirit and scope of the invention. This inventive technique can be used as a general way of implementing an IFFT/FFT. For instance, if a Radix-4 butterfly (where N=4) was used, the counter bits would be organized into 2 bit-tuples, also known as a double. Thus, the triplet can be replaced with the double in all of the operations; such as, creating permutations similar to pattern-0 sequence, pattern-1 sequence, etc. to form the memory addresses and subcarrier indices. The permutations are used to determine the right set of subcarriers associated with the butterfly (BF) for each clock cycle. The RCS insures that the correct symbol on one data lane is applied to the appropriate data lane at the BF. Similar modifications can be made when N=2, 16, etc. where an n-tuple which is an ordered set of n elements (bits) would be used in this innovative invention. The bit patterns would then be partitioned into a plurality of n bit units each called an n-tuple. A shuffler is used to permutate the triplets; however, any comparable circuit can used to perform this function, i.e. look up table (LUT). In addition, a network and a portable system can exchange information wirelessly by using communication techniques such as Time Division Multiple Access (TDMA), Frequency Division Multiple Access (FDMA), Code Division Multiple Access (CDMA), Orthogonal Frequency Division Multiplexing (OFDM), Ultra Wide Band (UWB), Wi-Fi, WiGig, Bluetooth, etc. The network can comprise the phone network, IP (Internet protocol) network, Local Area Network (LAN), ad hoc networks, local routers and even other portable systems.

What is claimed is:

1. An apparatus for a pipelined fast Fourier transform (FFT) comprising:
a first counter adapted to generate a first triplet and a second triplet;
a plurality of memories each configured to be identified by a third triplet;
a shuffler adapted to permute said first, second, and third triplets into a first sequence;
a plurality of first data lanes providing symbols;
a first barrel shifter coupled to said plurality of first data lanes and configured to shift symbols between said plurality of first data lanes if, upon an increment of one clock cycle, the first counter causes at least one selected triplet of said first sequence to change state;
said plurality of memories adapted to store one symbol from each of the first data lanes based on a first address formed by said first triplet and said second triplet in said first sequence;
a second counter adapted to generate a fourth triplet and a fifth triplet;
said shuffler adapted to permute said fourth, fifth, and third triplets into a second sequence;
each of said plurality of memories adapted to transfer stored symbols based on a second address formed by said fourth triplet and said fifth triplet in said second sequence to a plurality of second data lanes;
a second barrel shifter coupled to said plurality of second data lanes and configured to shift stored symbols between second data lanes if, upon an increment of one clock cycle, the second counter causes at least one selected triplet of said second sequence to change state; and
a first processing element (PE) of said pipelined FFT configured to receive stored symbols from said second data lanes.

2. The apparatus of claim 1, wherein said first PE calculates Radix-8 Butterfly symbols based on said stored symbols received from said second data lanes.

3. The apparatus of claim 1, further comprising: a parallel to serial converter configured to translate transmission block (TB) symbols to said plurality of first data lanes, wherein said TB symbols represent received noisy channel symbols.

4. The apparatus of claim 1, wherein said store is a write to said plurality of memories and said transfer is a read from said plurality of memories.

5. The apparatus of claim 1, wherein said first barrel shifter shifts said symbols between first data lanes either right or left; and said second barrel shifter shifts said stored symbols between second data lanes either right or left.

6. The apparatus of claim 1, wherein all symbols are complex comprising I and Q values wherein each value consists of a plurality of bits.

7. An apparatus for a pipelined fast Fourier transform (FFT) comprising:
a first counter adapted to generate a first n-tuple and a second n-tuple;
a plurality of memories each configured to be identified by a third n-tuple;
a shuffler adapted to permute said first, second, and third n-tuples into a first sequence;
a plurality of first data lanes providing samples;
said plurality of memories adapted to store one symbol from each of the first data lanes based on a first address formed by said first n-tuple and said second n-tuple in said first sequence;
a second counter adapted to generate a fourth n-tuple and a fifth n-tuple;
said shuffler adapted to permute said fourth, fifth, and third n-tuples into a second sequence;
each of said plurality of memories adapted to transfer stored symbols based on a second address formed by said fourth n-tuple and said fifth n-tuple in said second sequence to a plurality of second data lanes; and
a first processing element (PE) of said pipelined FFT configured to receive stored symbols from said second data lanes.

8. The apparatus of claim 7, wherein said first PE of said pipeline FFT calculates result symbols based on said stored symbols received from said second data lanes.

9. The apparatus of claim 8, wherein said first processing element is a Radix-N Butterfly where N is equal to 2 raised to an integer power greater than 0.

10. The apparatus of claim 7, further comprising:
a first barrel shifter coupled to said plurality of first data lanes and configured to shift symbols between first data lanes if, upon an increment of one clock cycle, said first counter causes at least one selected n-tuple of said first sequence to change state; and a second barrel shifter coupled to said plurality of second data lanes and configured to shift stored symbols between second data lanes if, upon an increment of one clock cycle, said second counter causes at least one selected n-tuple of said second sequence to change state.

11. The apparatus of claim 10, wherein said first barrel shifter shifts said symbols between first data lanes either right or left; and said second barrel shifter shifts said stored symbols between second data lanes either right or left.

12. The apparatus of claim 7, wherein said store is a write to said plurality of memories and said transfer is a read from said plurality of memories.

13. The apparatus of claim 7, wherein all symbols are complex comprising I and Q values and each value consists of a plurality of bits.

14. An apparatus for a pipelined fast Fourier transform (FFT) comprising:
- a plurality of memories each with stored symbols;
- a first counter adapted to generate a first n-tuple and a second n-tuple;
- a shuffler adapted to permute said first n-tuple, said second, and a third n-tuple into a first sequence;
- each of said plurality of memories adapted to transfer one stored symbol based on a first address formed by said first n-tuple and said second n-tuple in said first sequence to a plurality of first data lanes;
- a first processing element (PE) of said pipelined FFT configured to receive stored symbols from said first data lanes; and
- said first PE of said pipeline FFT configured to calculate symbols based on said stored symbols received from said first data lanes.

15. The apparatus of claim 14, further comprising:
- a second counter adapted to generate a fourth n-tuple and a fifth n-tuple;
- said plurality of memories each configured to be identified by said third n-tuple;
- a shuffler adapted to permute said fourth, fifth, and third n-tuples into a second sequence;
- a plurality of second data lanes providing symbols;
- a second barrel shifter coupled to said plurality of second data lanes and configured to shift symbols between second data lanes if, upon an increment of one clock cycle, the second counter causes at least one selected n-tuple of said second sequence to change state; and
- said plurality of memories adapted to store one symbol from each of the second data lanes based on a second address formed by said fourth n-tuple and said fifth n-tuple in said second sequence.

16. The apparatus of claim 15, wherein said store is a write to said plurality of memories and said transfer is a read from said plurality of memories.

17. The apparatus of claim 14, further comprising: a first barrel shifter coupled to said plurality of first data lanes and configured to shift symbols between first data lanes if, upon an increment of one clock cycle, the first counter causes at least one selected n-tuple of said first sequence to change state.

18. The apparatus of claim 17, wherein said first barrel shifter shifts said stored symbols between two different data lanes; and said second barrel shifter shifts said symbols between two different data lanes.

19. The apparatus of claim 14, wherein all symbols are complex comprising I and Q values and each value consists of a plurality of bits.

20. The apparatus of claim 14, wherein said first processing element is a Radix-N Butterfly where N is equal to 2 raised to an integer power greater than 0.

* * * * *